Figure 4:
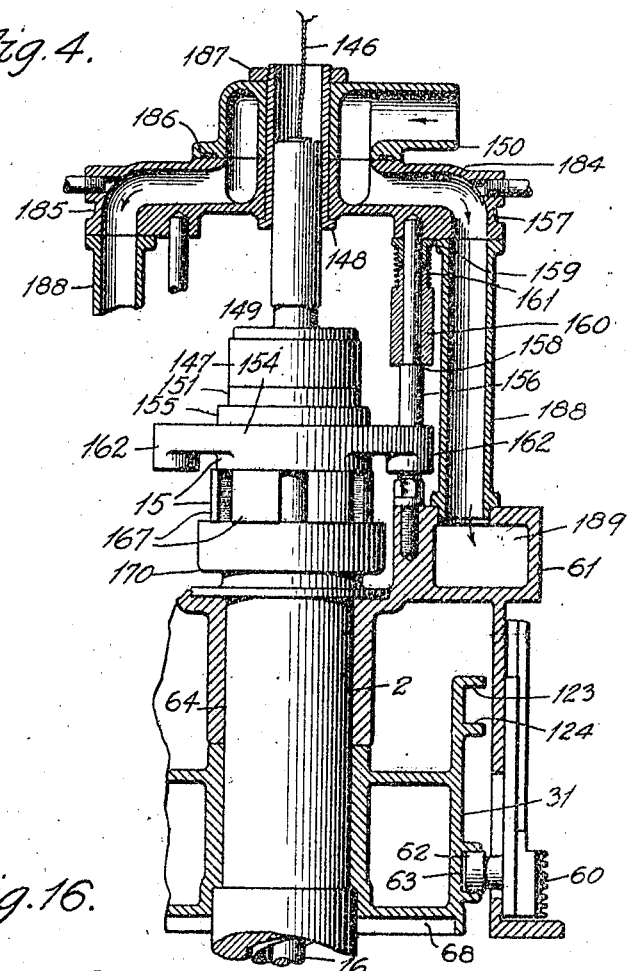

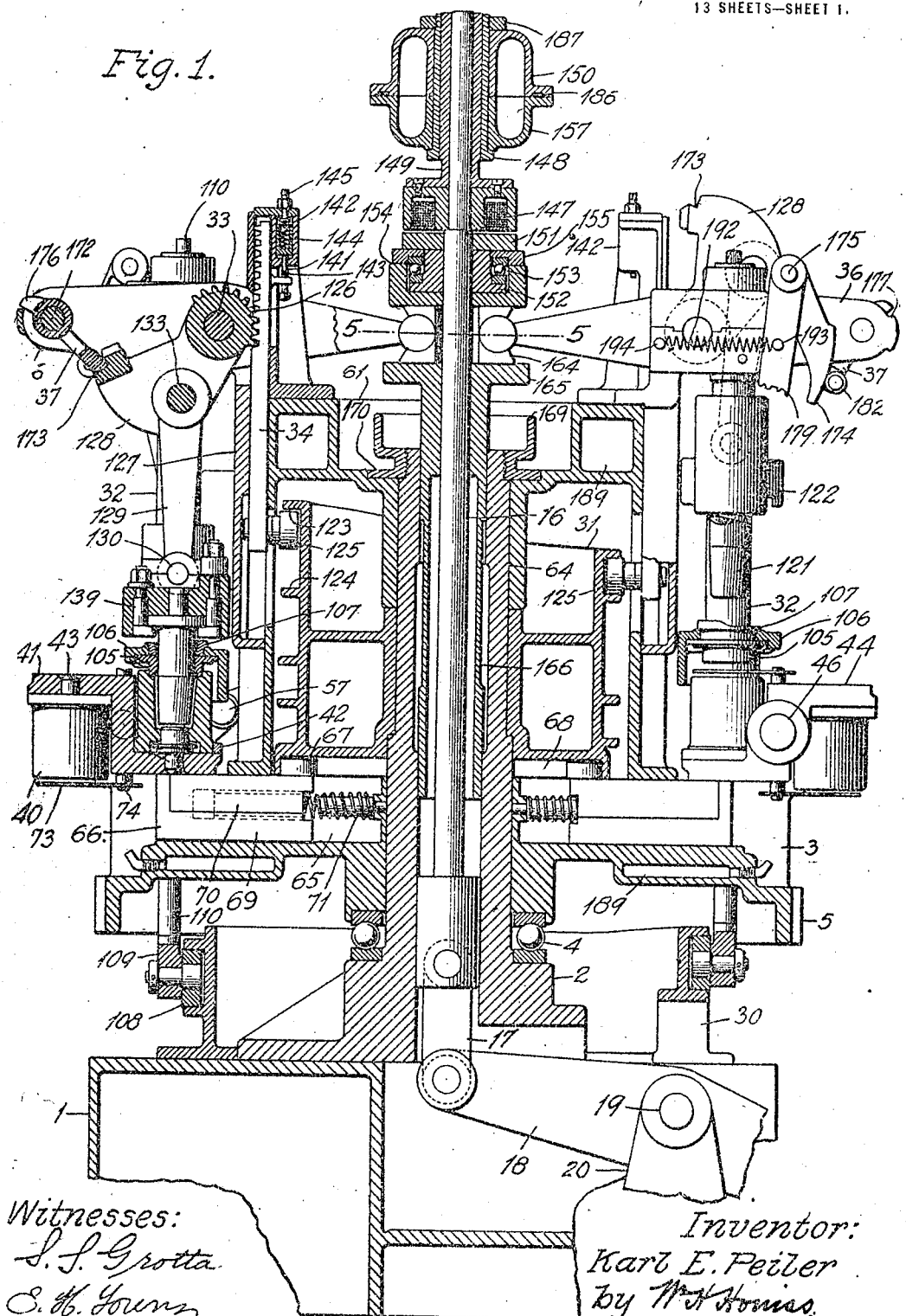

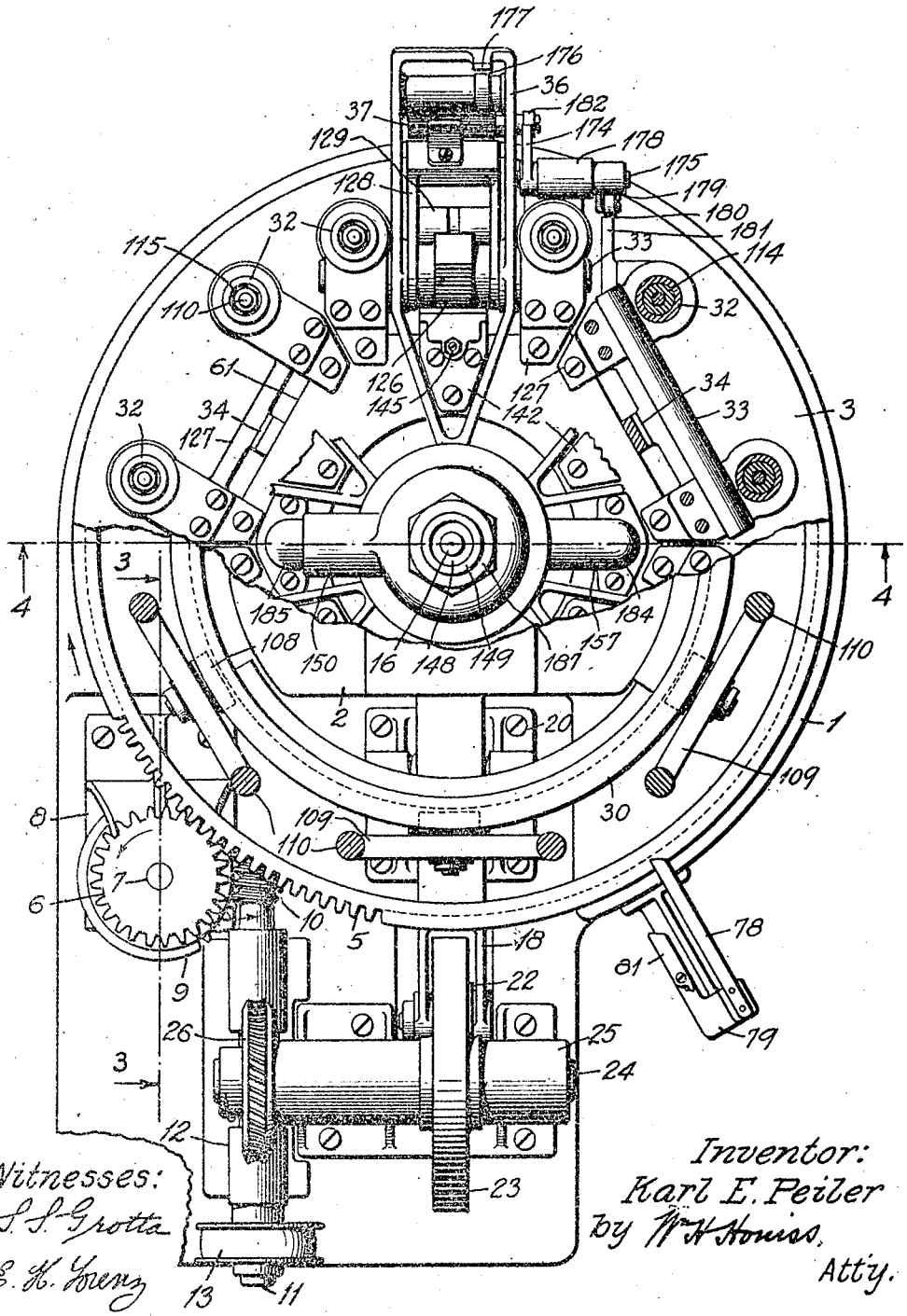

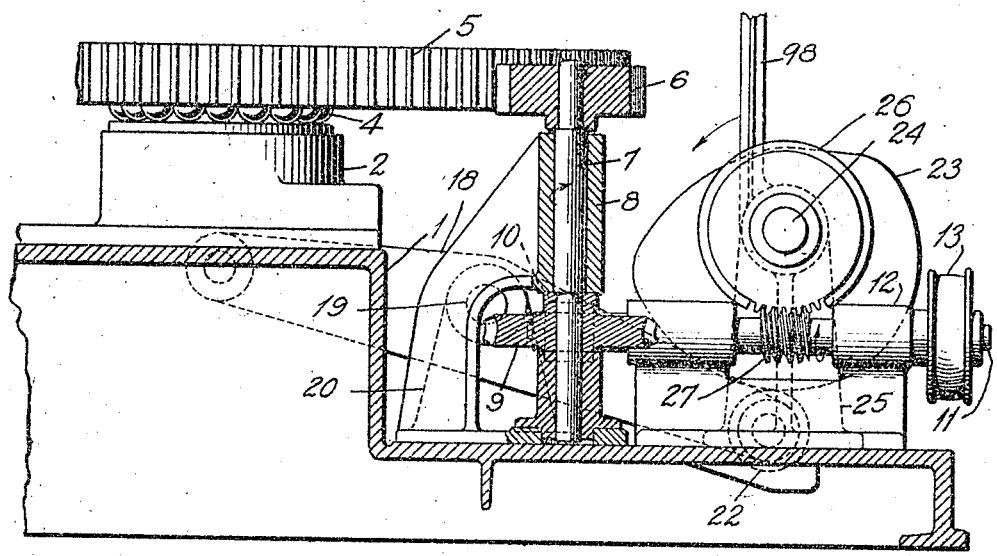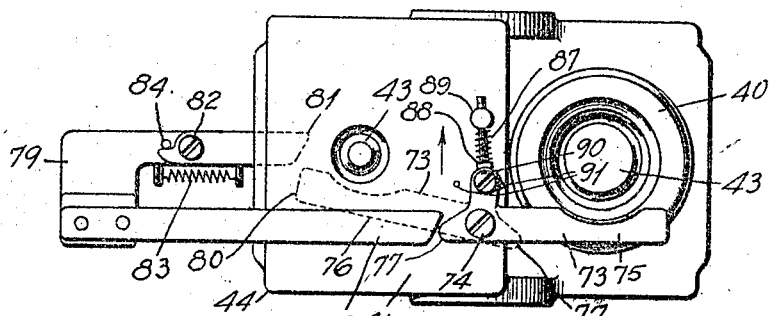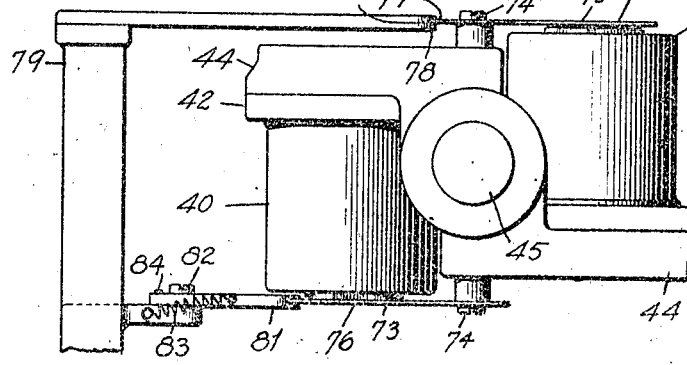

K. E. PEILER.
GLASS PRESSING MACHINE.
APPLICATION FILED AUG. 11, 1913.

1,292,033.

Patented Jan. 21, 1919.
13 SHEETS—SHEET 4.

Witnesses:
S. S. Grotta
E. H. Lorenz

Inventor:
Karl E. Peiler
by W. H. Honiss.
Atty.

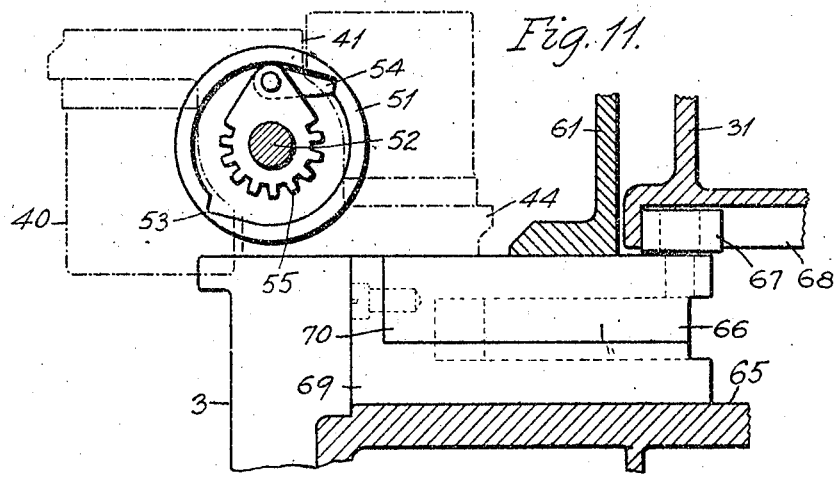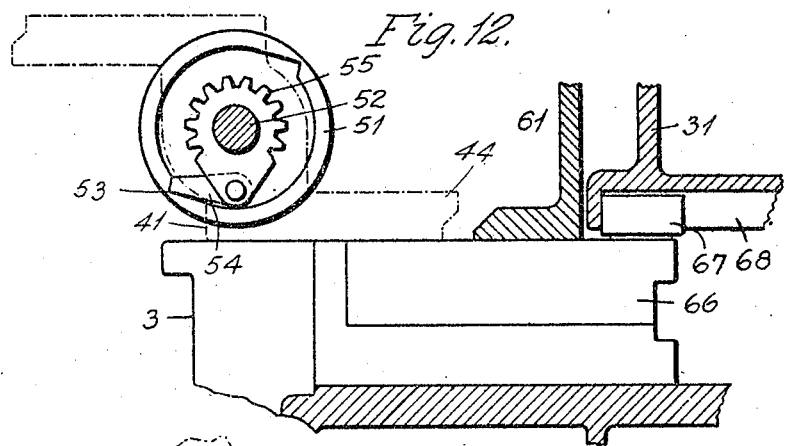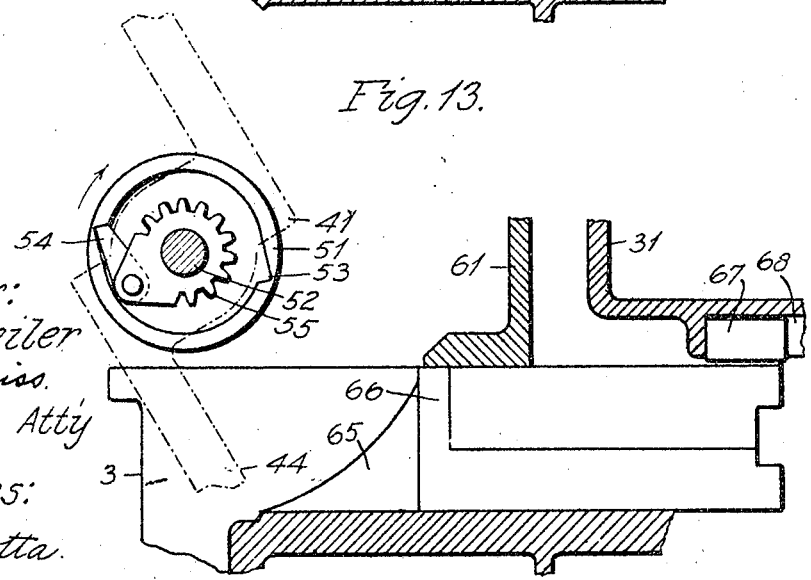

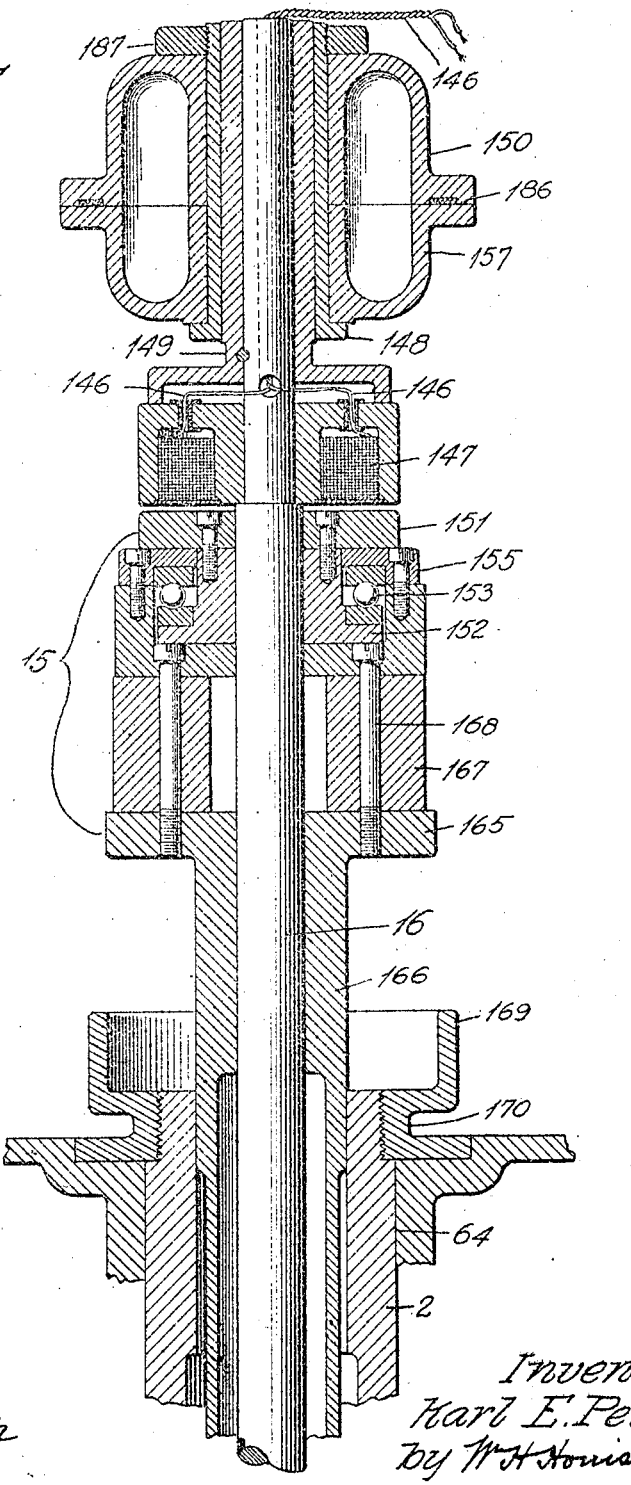

K. E. PEILER.
GLASS PRESSING MACHINE.
APPLICATION FILED AUG. 11, 1913.
1,292,033.
Patented Jan. 21, 1919.
13 SHEETS—SHEET 11.
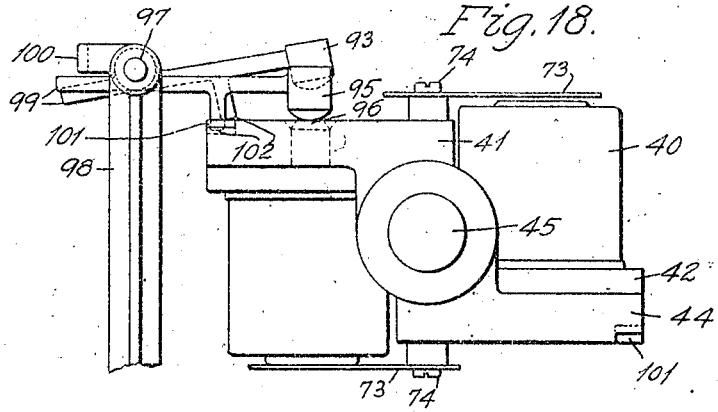
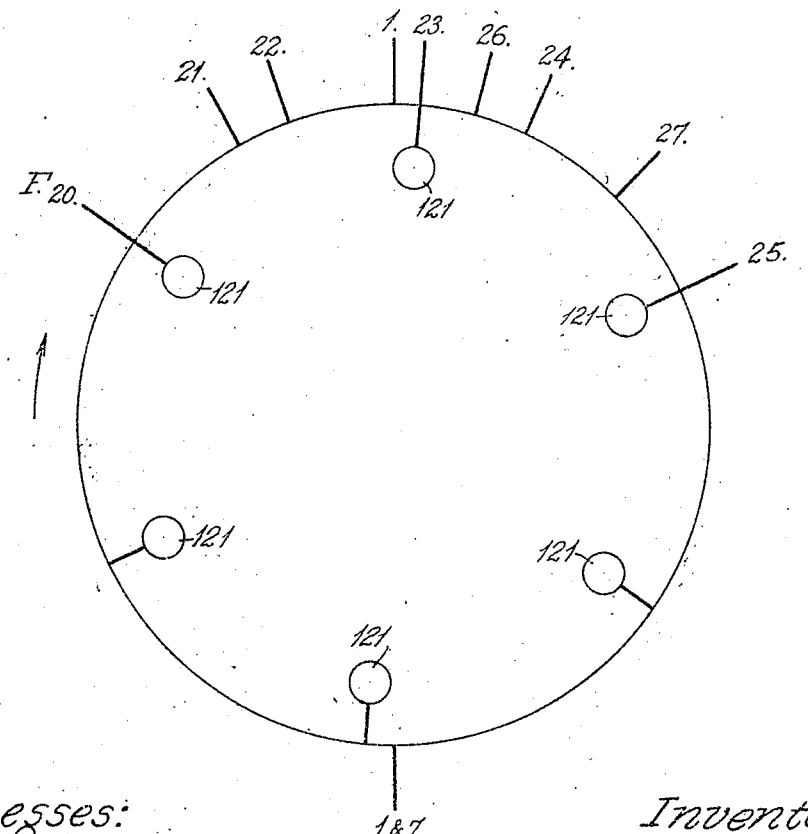
Witnesses:
S. S. Grotta
E. H. Lorenz
Inventor:
Karl E. Peiler
by W. H. Honiss
Atty.

K. E. PEILER.
GLASS PRESSING MACHINE.
APPLICATION FILED AUG. 11, 1913.

1,292,033.

Patented Jan. 21, 1919.
13 SHEETS—SHEET 13.

Witnesses:
S. S. Grotta.
E. H. Lorenz.

Inventor
Karl E. Peiler
by W. H. Howiss
Att'y

UNITED STATES PATENT OFFICE.

KARL E. PEILER, OF HARTFORD, CONNECTICUT, ASSIGNOR TO HARTFORD-FAIRMONT COMPANY, OF CANAJOHARIE, NEW YORK, A CORPORATION OF NEW YORK.

GLASS-PRESSING MACHINE.

1,292,033.          Specification of Letters Patent.          Patented Jan. 21, 1919.

Application filed August 11, 1913. Serial No. 784,194.

*To all whom it may concern:*

Be it known that I, KARL E. PEILER, a citizen of the United States, residing at Hartford, in the county of Hartford and State of Connecticut, have invented new and useful Improvements in Glass-Pressing Machines, of which the following is a specification.

This invention is an organized and improved machine for shaping molten glass by pressure, the object of the invention being to provide a well organized, rapid, efficient, and substantially automatic machine, with adequate provision for safety of the machine, and for applying the required amount of pressure to the glass and discontinuing that pressure without overstraining or damaging either the pressed ware or the machine.

Among the difficulties incident to the rapid and automatic pressing of glassware, which are overcome by this machine, may be mentioned the difficulty of providing and feeding to such machines a suitably regulated supply of molten glass in separated masses or gathers of proper volume, of uniform size and plasticity, and fed to the press in regular succession. If the "gather" is too small, it does not fill up the available space between the mold and plunger. If too large it overfills this space and is liable to strain the mold, the pressing mechanism, and the glassware itself, so that the latter will present a cracked or crizzled appearance. If the gathers of glass are too hot and plastic, they are liable to overheat the mold and plunger and require to be held in place longer while becoming set. If too cool and viscous they require greatly increased pressure to fill up the mold, besides being liable to overstrain and disarrange or break the machine.

Another important object of this invention is to provide in such a highly organized and rapid working machine a proper correlation and coördination of the parts most directly exposed to the heat of the glass, taking into account the proportions of the parts to each other in number and relative size, and providing not only the mechanism for working the several parts in suitable time and otherwise in proper relation to each other, but also providing sufficient working space and clearance for the proper operation of the various mechanisms. For example, it is desirable to keep the lower portions of the plunger and mold relatively cool, since they remain longest in direct contact with the hottest portion of each successive "gather" of glass. At the same time it is desirable to keep the mold ring and the upper portions of the plunger and the mold relatively hot, since they remain for a shorter time in contact with the thinner and cooler edges of the glass gather, which are extruded toward the top edges of the mold by the pressure below; and their function is to shape this cooler edge portion without too greatly reducing the heat and plasticity of these edges by their own absorption of the heat from the glass during its flow toward the top.

The machine herein illustrated is provided with a plurality of pressing or shaping mechanisms each of which has a pressing plunger, a mold ring and a pair of molds, with appropriate mechanism for operating these parts. This arrangement allows sufficient time for the ware pressed in each mold to remain therein long enough to become properly cooled and set in that mold, while another piece of ware is being pressed in another mold; and also facilitates the maintenance of proper operating temperature in the mold, mold rings and plungers. The plunger of each of these mechanisms operates in conjunction with a single mold ring alternately upon the two different molds of that mechanism. The number of pressing mechanisms employed, and the relative number of molds, mold rings and plungers employed in each mechanism should be adapted to the requirements of each case, according to the size and character of the ware, the rapidity of the desired operations and other conditions which will be understood by those familiar with the art of glass making.

Figure 5:
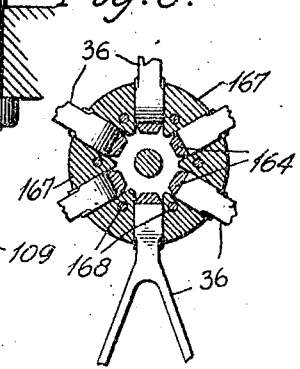
Figure 6:
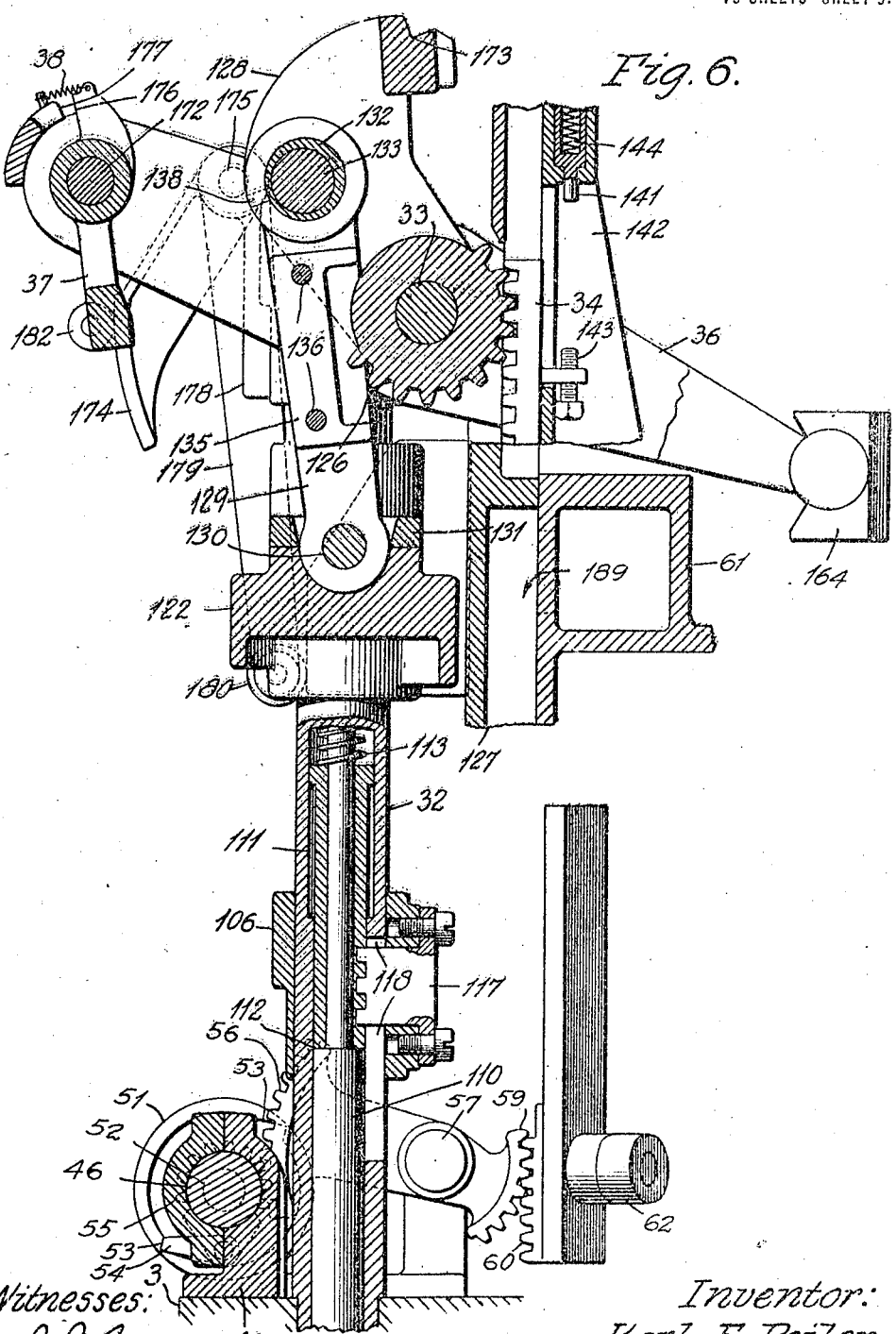

Figure 1 of the drawings is a side elevation, in section taken through the vertical center and axis of revolution of the machine. Fig. 2 is a plan view, some portions being broken away to show the different mechanisms. Fig. 3 is a front elevation of the main driving mechanism, in section taken substantially on the line 3—3 of Fig. 2. Fig. 4 is an elevation showing the upper portion of the machine in section taken substantially along the line 4—4 of Fig. 2. Fig. 5 is a plan view of the central portion of the machine, substantially at the plane indicated by line 5—5 of Fig. 1. Fig. 6 is a side elevation in enlarged scale of the mold and plunger operating mechanism, in section taken on the line 6—6 of Fig. 7.

Figure 16:
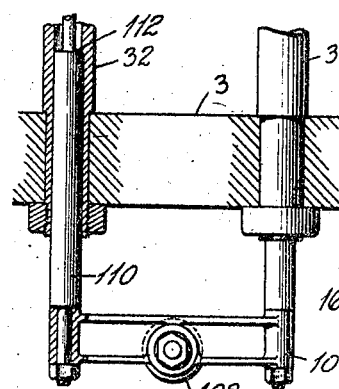
Figure 7:
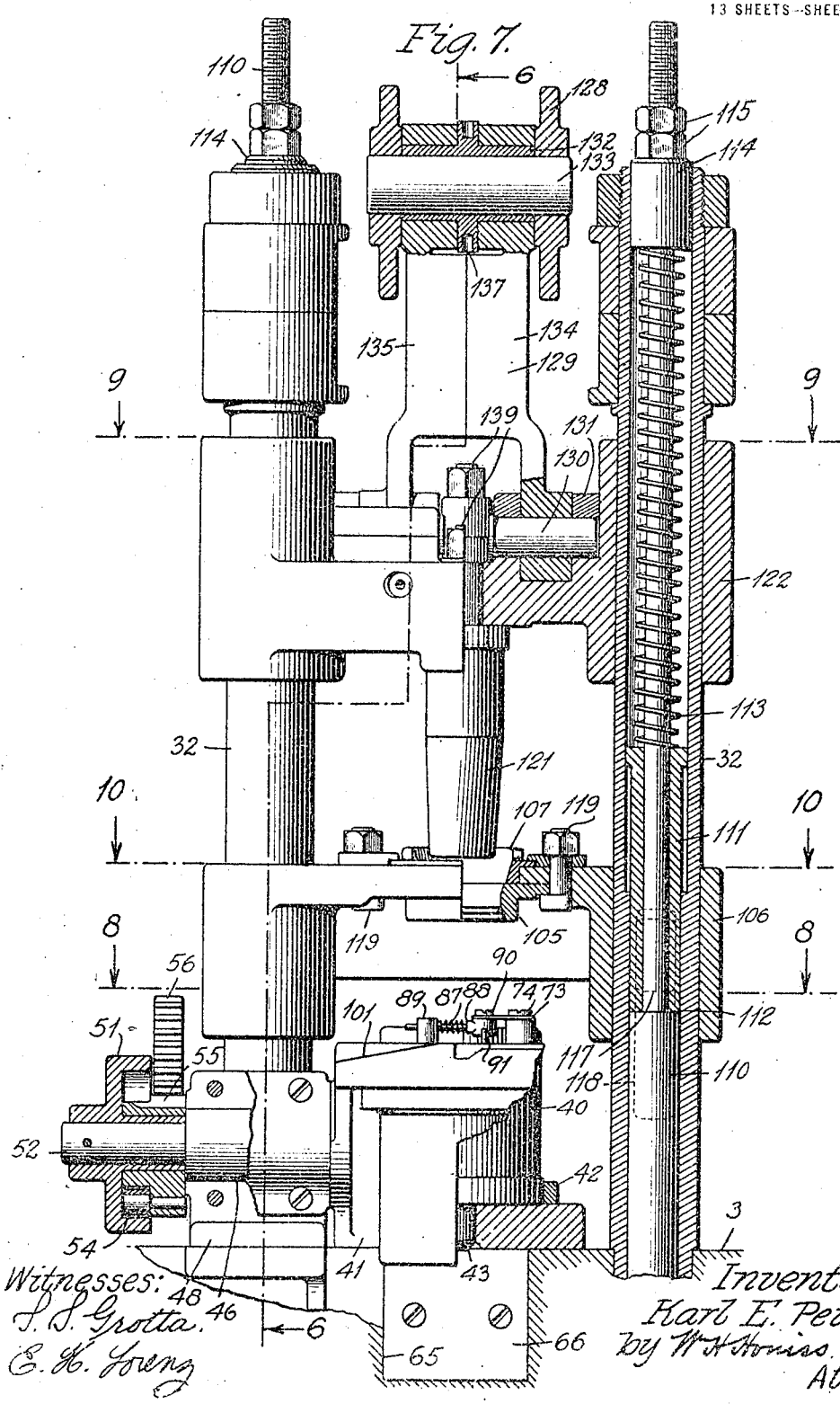
Figure 8:
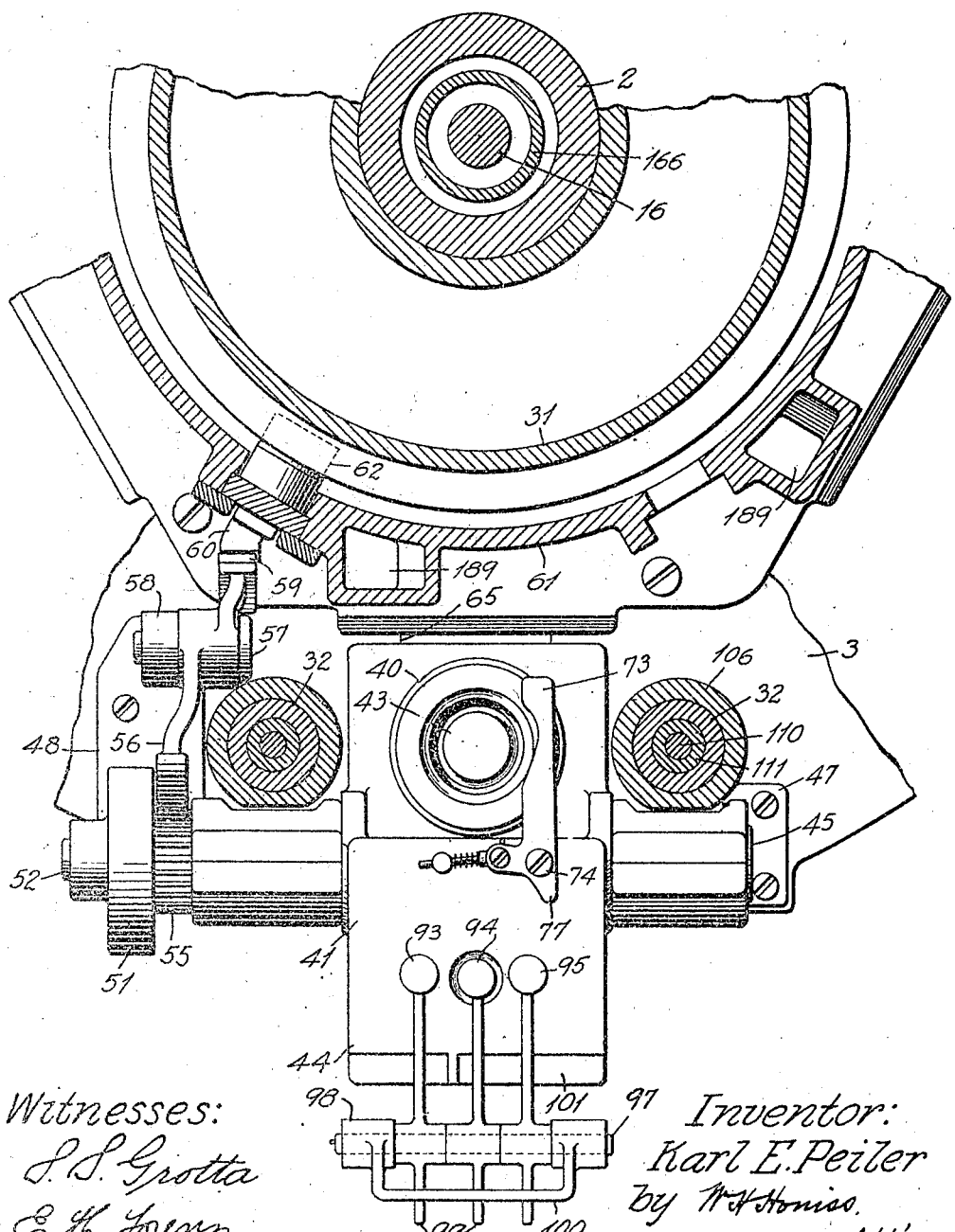
Figure 9:
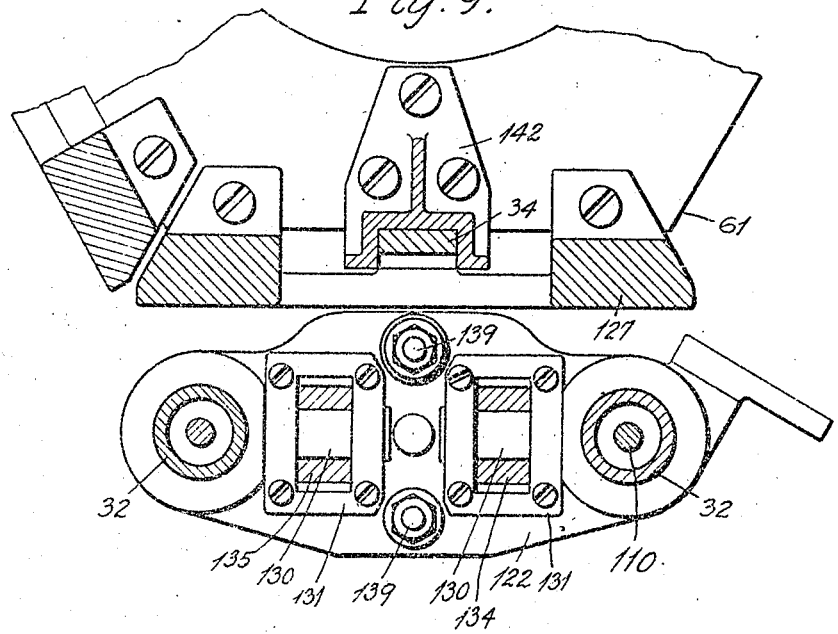
Figure 10:
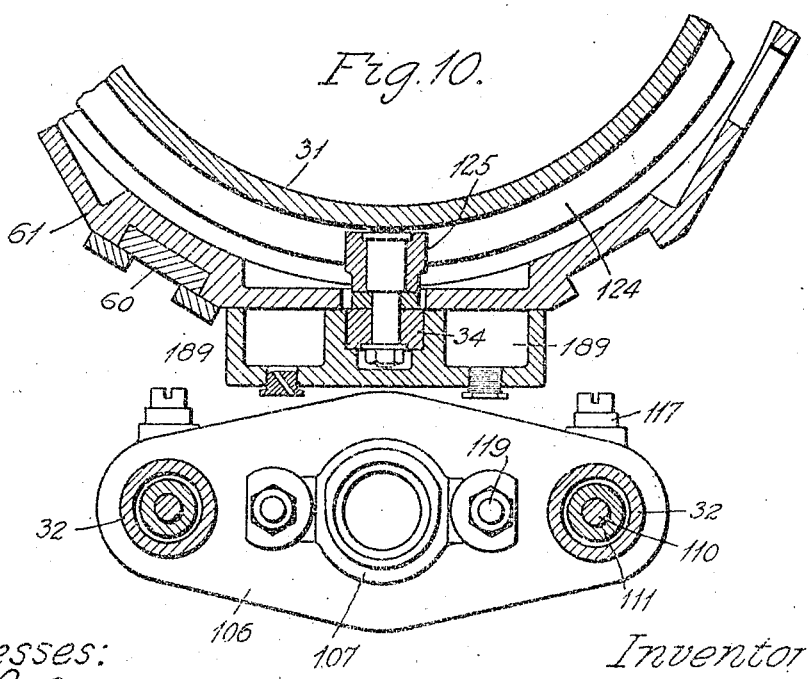

Fig. 7 is a front view projected from the left hand side of Fig. 6, some portions of the mechanism being shown in section taken through its longitudinal center. Fig. 8 is a plan view of a part of the machine in section taken on the line 8—8 of Fig. 7. Fig. 9 is a similar partial plan view in section taken on the line 9—9 of Fig. 7. Fig. 10 is also a fragmentary plan view in section taken on the line 10—10 of Fig. 7. Figs. 11, 12 and 13 are sectional side views, showing the construction, and illustrating the operation of the mold carrying and reversing mechanism. Fig. 11 shows the reversely disposed molds with the right hand mold in pressing position and the left hand mold in discharging position. Fig. 12 shows the mold reversing sector and pawl in the retracted portion of its mold reversing movement. Fig. 13 shows the mold supporting gate retracted and the mold carrier in partly reversed position. Fig. 14 is a plan view and Fig. 15 a side elevation of a pair of molds and their carrier, showing the ware retaining fingers and their operating means. Fig. 16 is a front elevation showing the mold ring operating yoke and its connections.

Fig. 17 is an elevation in section taken through its longitudinal center of the pressing head and showing its magnetic releasing connection. Fig. 18 is an elevation showing a pair of the molds and their tapping mechanism for loosening the ware. Fig. 19 is a chart or diagram for illustrating the relation of the parts and the various positions occupied by them in operation.

Figure 24:
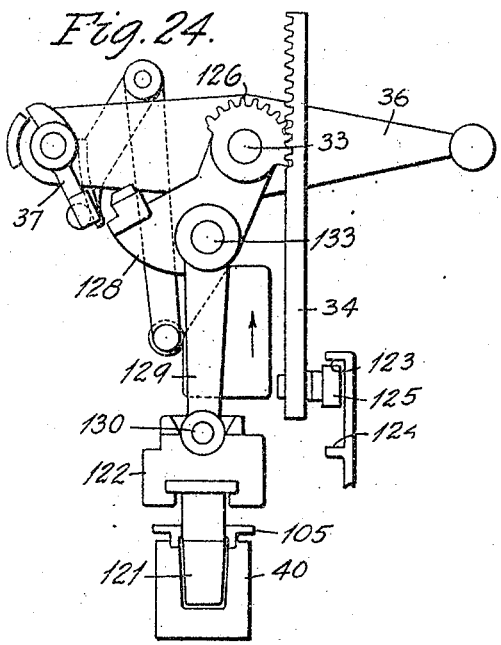
Figure 25:
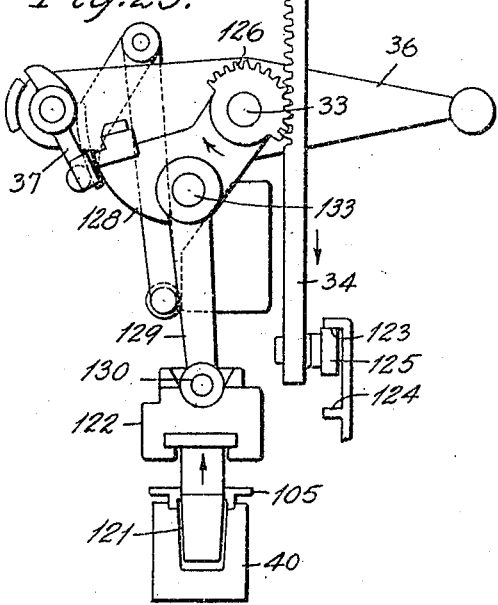
Figure 26:
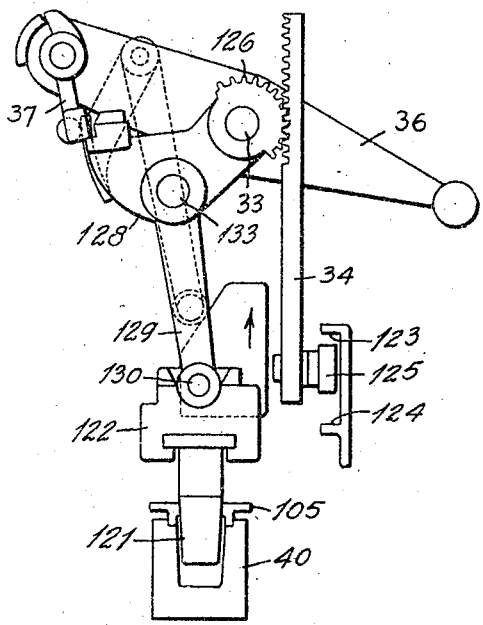
Figure 27:
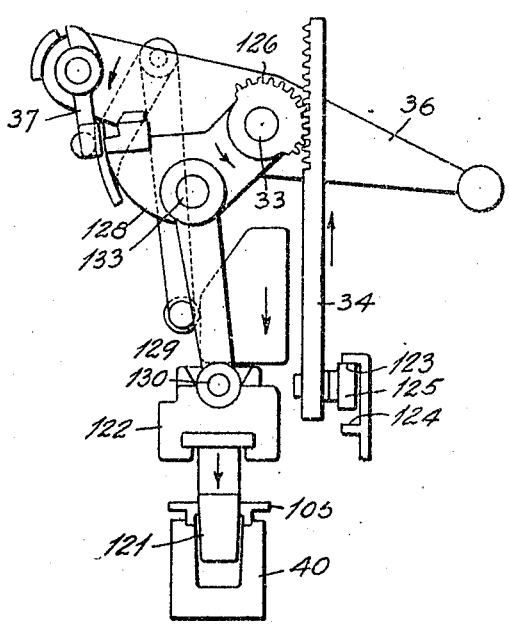

Figs. 20 to 27 inclusive are side views in smaller scale, and somewhat of a diagrammatic character illustrating the positions of the principal parts of the pressing mechanism at different phases or stages in their operation, Figs. 20 to 25 inclusive illustrating the successive stages of normal operation upon charges or "gathers" of glass of the proper size and plasticity, while Figs. 26 and 27 illustrate the safe operation of the mechanisms in the case of an abnormally large or hard gather or charge of glass.

This machine is mounted on a base 1, having fixed thereto the central column 2, upon which most of the machine is mounted and around which the moving parts revolve as a center. These revolving parts are supported upon a table 3, which is fitted to revolve freely around the lower portion of the column 2, ball bearings 4 being preferably employed to reduce the friction. The circumferential edge of the table is provided with gear teeth 5, which mesh with a pinion 6 on the upper end of a vertical driving shaft 7, which is mounted to revolve in a bracket 8 secured to the base 1. A worm gear 9 fixed to the lower end of the shaft 7 is driven by a worm 10 on the horizontal driving shaft 11, supported in the brackets 12 and driven by means of a belt from any convenient source engaging with the pulley 13. Or an electric motor may, if preferred, be mounted on an extension of the base 1 for driving the shaft 11. This driving train rotates the table 3, carrying a plurality of pressing mechanisms which revolve with the table around the central column 2.

This driving mechanism is also adapted to drive a pressing head 15 common to all the pressing mechanisms, having a driving connection extending axially through the column 2, consisting of a driving rod 16, connected by a link 17 with the end of the working beam 18, which is pivoted at 19 on the bracket 20. The outer end of the working beam is provided with a cam pin or roller 22, engaging with the peripheral surface of the cam 23, which is mounted on the horizontal shaft 24 journaled in the brackets 25 supported on the base 1. One end of this shaft has fixed upon it a worm wheel 26 which meshes with the worm 27 on the driving shaft 11. Thus this driving mechanism operates to rotate the table 3 and move the driving rod 16 up and down in predetermined and regular relation to each other. The driving rod 16 is detachably connected to the pressing head 15 by means of an electromagnet, as will be described later.

The machine illustrated herein being provided with six pressing mechanisms, the pressing head is moved up and down six times for each rotation of the table. Obviously, however, this proportion should be adapted to the number of pressing mechanisms employed.

The shaping or pressing molds and their mold rings and the shaping or pressing plungers are supported upon the table 3 for revolution around the central column 2, and their free working movements are imparted by engagement with stationary cams also disposed in concentric relation to the column. The peripheral cam 30 for operating the mold rings is here shown to be supported directly upon the base 1, while the cam paths or grooves for operating the plunger and mold mechanisms are made in another cam 31, which is herein shown to be an integral piece supported and fixed upon the outside of the column 2 inside of the turret 61.

The base of the turret 61 rests upon and is firmly secured to the table 3, and revolves therewith. Toward the upper end of the turret its central portion is journaled at 64 to the upper end of the column, thus centering these two parts with each other and mutually sustaining each other. The turret is generally circular in form, inclosing within it the cam 31. The body or wall of the turret forms a support for some of the sliding members of the mechanism, and upon its upper end are carried supporting brackets for the upper ends of the guide rods and for the plunger operating and pressing mechanisms. The wall of the turret is preferably cored out to form vacuum chambers, or chambers for receiving and distributing the compressed air or other fluids that may be required, according to the uses of the machine for cooling the shaping instrumentalities or for other purposes, the vacuum, or the air or fluid supply being induced or introduced to these chambers as shown in Fig. 4, and as hereinafter more fully described. This revolving structure, mainly comprising the table, the annular walled or tubular turret secured thereto, the vertical guides rigidly supported at top and bottom, all turning as a unitary structure around the central column, forms an extremely rigid structure well adapted to withstand the severe and intermittent torsional and other resistances encountered in revolving these parts continuously, and at the speed required for their greatest efficiency. The practically continuous annular wall of the turret, in addition to thus stiffening the entire rotating structure, is utilized to form guideways for the connections between the outside working parts and the inner cams and pressing head, which operate those exterior parts, besides serving to inclose and protect the operating parts referred to, from shreds or slivers of glass and other flying or floating foreign substances which might injure the mechanism, and also from the heat of the shaping mechanisms, attendant upon their shaping operations.

Figure 20:
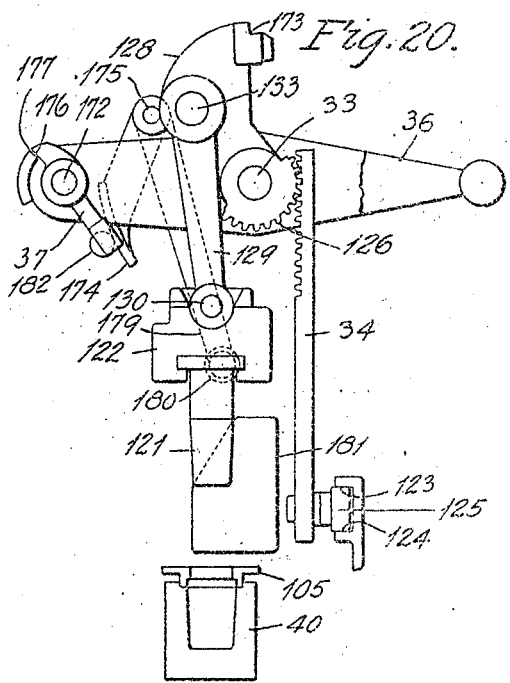
Figure 21:
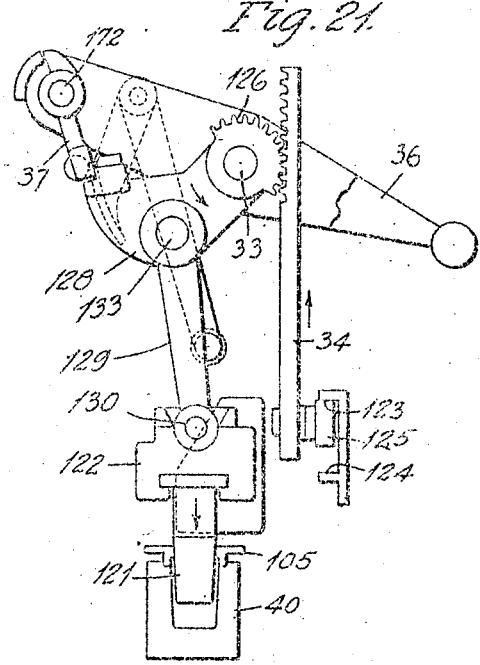

The molds are carried upon a series of trunnioned carriers 41 resting on the top of the table 3, while the mold rings and plungers are mounted on yokes which are fitted to slide vertically on guide rods 32, supported by the table 3 and turret 61 and preferably arranged in pairs spaced at equal angular intervals around the table. The mold rings 105 are raised and lowered from below by means of the cam 30, while the plungers are raised and lowered, through their free, or non-pressing movements by means of a toggle joint connection from the rock shaft 33, actuated through a rack 34 from the cam groove 35 in the cam 31. For its shaping pressure on the glassware, each plunger is also actuated by an independently operated auxiliary or coacting pressing device, through the pressing levers 36, which are mounted for rocking movement concentrically with the shafts 33, their outer ends conditionally engaging with the toggle joint, when the latter normally reaches its pressing position, by means of pawls 37, as shown in Figs. 1, 20 and 21. These pressing levers 36 are disposed around the machine preferably in substantially radial relation to the center of revolution, their inner ends being operated by the centrally disposed pressing head 15 through the medium of the releasing connection above referred to, which may be adjusted or regulated to release at the pressures required or desired for different articles.

The members of the machine which are involved in the application and transmission of the principal pressures are so disposed as to act and react at or substantially parallel with the axis of revolution of the press, with a minimum of stress acting in a direction transverse to that axis. The principal final pressure is transmitted in a vertical direction to and through the pressing head 15 at the center of revolution of the plungers. The resultant pressure upon the plungers is in a downward direction, while the reacting pressure upon the rocker shaft 33 is in an upward direction. Thus the stresses are disposed not only in an up-and-down direction parallel with the vertical axis of revolution of the machine, but are balanced in opposite directions as far as possible, upon the revolving unitary structure of the turret and its appurtenances. The pressure is transmitted to the revolving levers not only at the center of their revolution, but in an axial direction, which in connection with the ball bearing mounting of the swiveling pressing head enables the required pressures to be transmitted smoothly, with a minimum of friction, and of disturbance to the balance of the entire revolving structure.

Following this brief general description of the main parts, they will now be described in detail:—

The molds 40, which may be of any desired form, are arranged in pairs upon opposite lateral wings 44 of a trunnioned mold carrier 41, having a cross-sectional outline somewhat resembling the letter Z, as best shown in Figs. 1, 11, 12 and 13. For convenience in changing these molds they are preferably made separate, and are centered and clamped in proper position on their carriers in any convenient way as by means of the rings 42. The molds are herein shown to be provided with bottom valves 43, the ends of which project through the supporting wings 44 of their mold carriers, to facilitate loosening and delivering the ware from the molds when the latter are inverted.

The centers of the two molds of each pair are disposed at equal distances from and on opposite sides of the axis of the mold carrier. The oppositely disposed trunnions 45 and 46 of these carriers are mounted for turning movement in brackets 47 and 48, secured upon the table 3. This trunnioned construction enables each mold carrier to be turned through a half revolution between the successive pressing operations, thus inverting the mold containing the ware last pressed, and bringing the other now empty mold into pressing position right side up and in line with its plunger and mold ring. This reversing operation is accomplished by the mechanism shown in Figs. 6, 7 and 8, and 11 to 13. A ratchet wheel 51 is fixed upon one of the trunnions, or an extension 52 thereof, as best shown in Fig. 7. An annular flange of this ratchet is provided on its inner surface with two oppositely disposed notches 53 for receiving the end of a pawl 54, which is mounted on a sector gear 55 fitted to turn freely on and concentric with the trunnion bearing. This pinion is turned back and forth slightly more than half a revolution by means of a sector gear 56 mounted on a stud 57 carried by the lug 58. That sector is provided with gear teeth 59 engaging with the teeth of a rack 60, which is fitted for vertical sliding movement in the turret 61, as best shown in Figs. 4, 6 and 8. The rack is provided with a cam pin or roll 62 engaging with the cam groove 63 in the peripheral surface of the fixed cam 31, that cam path being so disposed and shaped as to turn the mold carrier half a revolution in the direction of the arrow shown in Fig. 13, as each pair of molds reaches in its revolution around the column the point where it is desirable to bring an empty mold into its pressing position.

In order to enable the molds thus to be reversed, the table 3 is recessed at 65 to clear the revolving portions of the mold carriers and their molds; and in order to provide a suitably firm support for the molds during the pressing operations, a movable abutment, which in this case is in the form of a slide 66, best shown in Figs. 11, 12 and 13, is employed, provided with a cam roll 67 engaging with a cam surface 68 on the cam 31, which draws back the slide 66 against the pressure of springs 71 to the position shown in Fig. 13 just before the molds are reversed; then lets the slide forward again, to the position shown in Figs. 11 and 12 to form a solid base beneath the mold for supporting it against the shaping pressure. For convenience in assembling and disassembling, the slide is herein shown as being in two parts, 69 and 70, detachably fastened together by screws.

In order to prevent the pressed ware from dropping out prematurely during the inversion of the molds, the latter are provided with retaining fingers 73, which are mounted on the mold carriers, each finger being pivotally attached by means of a screw 74 to the mold carrier at a point which permits the finger to swing over and away from the mold opening, as shown by comparison of the positions of the upper and lower fingers in Fig. 14. Just prior to the inversion of the mold, an extension 77 of the finger collides with a cam-like projection 78 attached to a fixed portion 79 of the machine, thereby swinging the retaining finger over the mold opening, and thus preventing the ware from dropping out during and after inversion of the mold, until the ware arrives over the take-off device or other intended delivery position, whereupon the outer end 80 of the finger collides with another cam-shaped projection 81, whereupon the retaining finger 73 is swung backwardly from in front of the ware, allowing the latter to drop out. In the particular arrangement here shown, in order to allow the finger to pass by the cam projection 81, the latter is hinged at 82, and held in its operating position by means of a spring 83 against a stop pin 84. After the retaining finger 73 is swung to its fully opened position, its continued movement swings the cam projection 81 against the pressure of the spring until the finger passes by, whereupon the cam projection returns to its first position.

Suitable means are provided for holding the retaining fingers in their open and closed positions. The means here shown consist of a spring 87 coiled around a guide or plunger 88 fitted to slide in the stud 89 and joined at 90 to an arm of the retaining finger 73. The pressure of the spring 87 tends to hold the retaining finger in either of its two positions, against the stop pins 91.

In order to insure the discharge of the pressed ware from the mold, a tapping device is preferably employed, which as herein shown consists of three hammers 93, 94 and 95, which are made to drop in succession upon the outer end 96 of the mold valve 43, projecting through or exposed through the bottom of the mold carrier, as shown in Figs. 1 and 18. These hammers are mounted side by side upon a pivot rod 97 supported at its ends by stationary brackets 98 attached to the frame or base of the machine. These hammers are provided with rearward extensions 99 which project beneath the cross piece 100 of the brackets and thus serve as stops for the lower position of the hammers. For lifting and dropping the hammers, they are provided with shoulders or projections which engage with inclined ledges 101 formed on the outer ends of the mold carriers. As these carriages swing past the hammers the shoulders 102 of the latter ride up on these inclines, thus raising the hammers which then successively fall into a depression of the ledge 101, as the center of the mold valve passes under the successive hammers. The succession of blows operates to loosen the ware from the mold. A greater or less number of the hammers may be used according to the necessities of different kinds or shapes of glassware.

The mold rings 105 are supported in a concentric relation to the plungers and to the pressing positions of the molds, by means of a yoke 106, the bearings of which are fitted to slide upon the guide rods 32, as best shown in Figs. 6, 7 and 10. A ring 107 having a flaring or funnel shaped flange to provide a more extended mouth for receiving the charges of molten glass as they are delivered to the mold is preferably secured to each of the yokes 106, concentrically with the mold ring, as shown in section in Figs. 7 and 10. These mold ring yokes are moved up and down on the guide rods 32, by means of the cam 30 (Figs. 1 and 2) engaging with a cam pin or roll 108 on a yoke 109 secured at its ends to connecting rods 110, which extend upwardly through the guide rods 32 which are made in tubular form for this purpose. The lower portions of these connecting rods fill the bore of the tubular guide rods, but higher up they are turned to a smaller diameter to receive the sleeves 111, which also fit the interior bore of the guide rods. The sleeves 111 are held downwardly against the shoulders 112 of the connecting rods, by means of the springs 113, the upper ends of which abut against adjustable collars 114 fitting in the upper ends of the tubular guide rods 32. The collars are adjusted by means of the nuts 115 to vary the tension of the spring pressure upon the yokes 106. Connection between the mold ring yoke 106 and the connecting rods 110 is made by means of clutch dogs 117, which are secured at the backs of the yokes and project through slots 118 in the tubular guides 32 and have notched interlocking engagement with the wall of the sleeve 111, as best shown in Figs. 6 and 7.

As each mold revolves into its pressing position, the mold ring is moved down and seated on the mold by means of the cam 30, which is shaped so as to carry the yoke below the level actually needed for bringing the mold ring into contact with the mold, the springs 113 yielding to the same extent, thus putting the pressure of those springs upon the mold rings to hold them in position. In case the downward movement of the mold ring should be obstructed by accident, such as the breaking or disarrangement of the parts below it, the springs 113 enable the mold ring to yield to the obstruction, while permitting the cam yoke 109 to make its complete stroke without undue strain.

The mold rings 105 are preferably made separable from the yoke in order that they may easily be removed and replaced when worn out, or to enable different mold rings to be employed. The mold rings are clamped to the yoke by means of the hook bolts 119, or in any other convenient way.

The plungers 121 for shaping the interior contour of the glassware are mounted for vertical movement into and out of the molds and mold rings. They are attached to the plunger yokes 122 (Figs. 1, 6, 7 and 9) which are fitted for sliding movement upon the guide rods 32 above the respective mold ring yokes 106. These yokes, carrying the plungers, are moved up and down upon the guide rods from the lowest position shown in Fig. 1 to the highest position shown approximately in Figs. 6 and 7 by means of a stationary cam 31, around which the plungers are carried by the rotation of the machine. The upper and lower cam surfaces 123 and 124 of the cam engage with a cam pin or roller 125 appurtenant to a rack 34, which is fitted for sliding movement in and revolves with the turret 61 carried by the table. The upper end of the rack 34 is provided with gear teeth engaging with a sector gear 126 turning upon the shaft 33, which is supported at its ends in the bracket 127. These brackets are clamped upon the upper end of the turret and extend outwardly to the upper ends of the guide rods 32, which they thus serve to support in fixed parallel relation to each other. The sector gear 126 is provided with a crank arm 128, to which is pivotally attached a connecting rod 129 having its lower bifurcated ends pivotally attached to the plunger yoke 122 by means of the wrist pins 130, the ends of which are secured to the yoke 122 by means of caps 131 (Figs. 7 and 9). The arm 128 and the connecting rod 129 serve as a toggle joint, which at their lower position shown in Fig. 1 facilitates the application of the pressing pressure upon the ware, as hereafter explained. To enable the lowermost position of the yoke to be adjusted to regulate the thickness of the ware, the upper end of the connecting rod 129 is mounted upon an eccentric sleeve 132 supported by the wrist pin 133. For convenience in assembling and adjusting the parts, the connecting rod 129 is herein shown to be made in two longitudinally separable parts 134 and 135 (Fig. 7), the upper ends of which are slipped toward each other upon opposite ends of the eccentric bushing 132, and secured together by bolts 136, leaving a central flange of that bushing exposed for convenient rotary adjustment of its eccentric portions, by means of the spanner holes 137 or in any other convenient way. The bushing is clamped or otherwise secured in its adjusted positions by means of screws 138 bearing against the wrist pin 133 (Fig. 6) when the desired reach is obtained.

The plungers 121 are seated in the yokes 122 concentrically with the respective molds 40 and mold rings 105 with which they cooperate, and are secured thereto by means of hook bolts 139 or any other convenient way.

Figure 22:
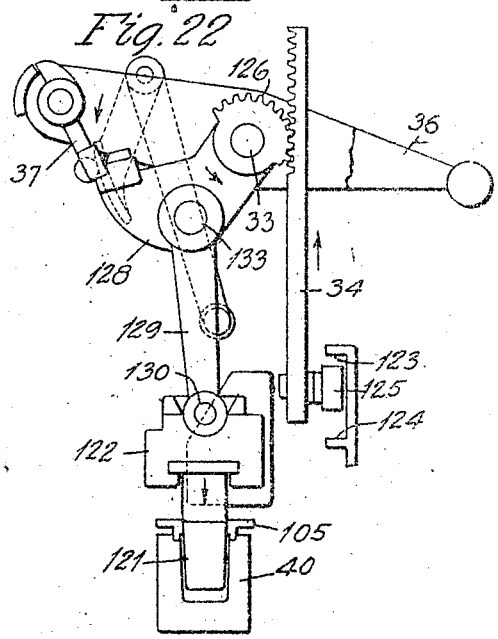
Figure 23:
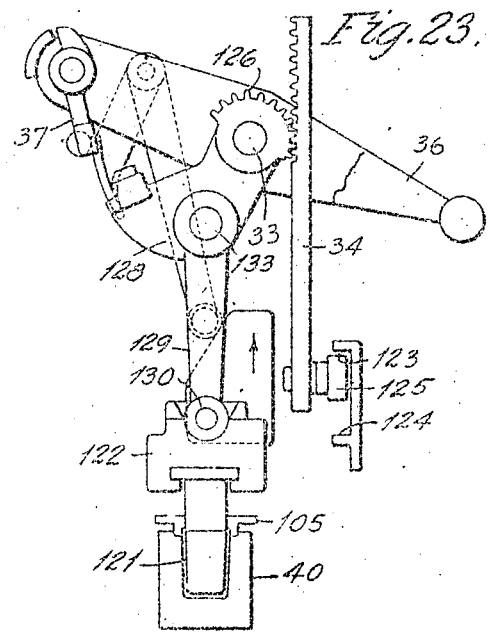

The cam surfaces 123 and 124 of the cam 31 engaging with the roller 125, as is shown by comparison of Figs. 20–27, do not fit that cam roller all the way around the cam, but are relieved at and adjacent to the pressing position as shown in Figs. 22 and 23. The clearance between the roll and lower cam surface 124 is to provide for the possibility that the normal downward movement of the plunger may sometimes be obstructed either by misdelivery of a charge of glass or by some disarrangement of the parts. Therefore the plunger is not moved positively downward, but is let down upon the glass by the upper cam surface 123 as shown in Fig. 21, being impelled by its own gravity, due to the weight of the plunger, yoke and other attached parts aided or counterbalanced as may be needed by weights or springs. This downward movement of the plunger and yoke is thus regulated by the contour of the upper cam surface 123, which is also relieved, as shown in Figs. 22, 23 at and near the pressing position, so as to clear the roller, and allow the plunger to be moved further by the pressing mechanism to be hereinafter described.

In order to relieve the glassware from undue pressure of the weight of the plunger and yoke, after the shaping pressure has been applied and discontinued, an adjustable counterbalancing device is employed at some portion of the plunger mechanism. It is herein shown as being applied at the top of the rack 34 (Figs. 1 and 6). A buffer or plunger 141 pressed down by the spring 144 is mounted for vertical sliding movement in the bracket 142, with its lower end projecting into the pathway of the tappet 143 appurtenant to the rack 34. The tappet or the plunger, or a bracket carrying the plunger, may be made vertically adjustable for convenience in setting and adjusting the device. A tension screw 145 or any other well-known or convenient means is employed to enable the counterbalancing force of the spring to be adapted to the relative weights of the parts which require to be counterbalanced.

The pressing mechanism for applying a definite and closely adjustable amount of shaping pressure to the plungers upon the glassware, acts through and coacts with the plunger mechanism, but is otherwise mounted and operated independently of that plunger mechanism. This pressing mechanism is arranged to act upon the plungers in succession, conditionally upon the normal operation of the latter, as they approach the pressing position shown in Fig. 21. The pressing movement is imparted by the cam 23 through the working beam 18 acting upon the driving rod 16 which extends vertically through the column 2 at the center of revolution of the revolving plunger mechanisms. To the upper end of the rod is secured an electro-magnet 147 by means of a flanged sleeve 149 which is fitted for sliding movement in the central upper portion of the framing (Figs. 1 and 4). The latter is preferably provided with a bushing 148 which serves as a bearing for the sliding sleeve 149 of the magnet, and also serves as a bearing for an air inlet 150, as is hereinafter more fully described. When in action, the lower surface of the magnet 147 engages with an armature 151, secured to the friction collar 152 forming one member of a ball bearing containing the balls 153, which enables the armature to stand still when seized by the magnet, while allowing the other members 154 and 155 of the friction bearing to turn with the revolving pressing head 15, to which they are secured. The friction ring 155 made separately for convenience of assembling and adjustment is secured to the revolving casing 154, the latter being made to revolve by its connection with the pressing head best shown in Figs. 4 and 17. The casing 154 is provided with projecting hubs 162 which serve as guides, engaging with and sliding upon the guide rods 156, the lower ends of which are secured in the upper portion of the revolving turret 61, while the upper portions are supported in the cap or crown 157 of the revolving parts. These guide rods are also utilized as supports for a spring device for increasing the gap between the magnet and its armature after the latter have been separated in the pressure releasing operation hereinafter described.

The upper ends of the guide rods 156 are provided with shoulders 158 upon which are seated the thimbles 159 and 160 facing each other and having a spring 161 between them tending to press the thimbles apart. The bosses 162 of the casing 154 when carried upward by the magnet collide with the lower surfaces of the thimbles 160 and by continued movement receive the increasing pressure of the springs 161. These springs are not strong enough to overcome the force of the magnet, which in the normal working of the machine is intended to be overcome by the increased resistance of the glass when it has completely filled the mold and mold ring. But when thus overcome and separated by the resistance of the glass, the gap between the magnet and its armature is quickly increased by the tension of the springs 161. If, however, the mold should be empty, through failure to receive a charge of glass, or while starting up the machine, or otherwise, the magnet and its armature will be forcibly separated by the meeting of the ends of the thimbles 159 and 160, which thus oppose a solid resistance to the further upward movement of the armature, thus forcibly separating it from the magnet and thereby preventing the bottom ends of the plunger from abutting against and perhaps injuring the plungers or the bottom valves of the mold. A further important purpose served by this positive separation of the magnet and armature is that the pressing levers are thereby enabled to make their full stroke at each successive pressing operation, whether operating normally upon the glass, or acting upon empty molds. The leads of the magnet windings may be run through holes or grooves to the top of the driving rod 16 as shown in Fig. 17, and thence to any suitable energizing means.

The operating connection between the centrally disposed pressing head and the outlying revolving plunger mechanisms is effected by means of a pressing lever 36 for each of those mechanisms, as best shown in Figs. 1, 2 and 5. The inner ends of these levers are rounded and seated in blocks 164 fitted for radial sliding movement in the centrally disposed pressing head 15, which revolves with the plunger mechanism. For convenience of construction and assembling the pressing head is preferably made of separable parts. The casing 154 and the flange 165 of the sleeve 166 are joined together by means of triangular spacing blocks 167 (Fig. 5) secured by means of screws 168 and also preferably tongued and grooved or doweled to locate and maintain them in proper position. These triangular separating blocks 167 form between them seats for the sliding boxes 164 allowing for radial sliding movement of the block sufficient to allow it to freely follow the arc of swinging movement of the press levers 36. The sleeve 166 is fitted for sliding movement in the column 2 and may also serve as a guide for the middle portion of the magnet driving rod 16. The flange 165 of the sleeve is here shown as fitting inside of an upward annular extension 169 of the nut 170 which thus serves as a pneumatic dash pot for cushioning the fall of the pressing head 15 and its connected parts when the armature is released from the magnet.

The pressing levers 36 are herein shown to be disposed in generally radial relation to the pressing head. They are of open form (Fig. 2), the opposite sides of which are supported upon the rock shaft 33 (Figs. 1 and 2) hereinbefore described. Thus the swinging movement of each pressing lever 36 is concentric with the oscillating movement of the crank 128 which operates the associated plunger. The press levers are provided with coupling devices which under normal conditions of working operate upon the crank 128 and its attached connecting rod 129 as shown in Fig. 1, acting to straighten out the toggle joint of these two members and thereby imparting the shaping pressure to the glassware. Pawls 37 are mounted to swing upon pivot pins 172 at or near the outer ends of the pressing levers 36 in engaging relation to the outer surfaces of the respective cranks 128, against which the lower ends of the pawls are pressed by means of springs 38. Stops 176 on the pawls engage with stops 177 on the pressing levers, to limit the inward movement of the pawls.

The plunger mechanisms driven by the cam 23 operate once during each revolution of the table, while the pressing cam 31 operates the pressing mechanism a number of times during each revolution of the table equal to the number of plunger mechanisms, which in the six plunger machine illustrated herein would be six times. The principal movements and relative positions of the plunger and pressing mechanisms are illustrated in the diagrammatic views of Figs. 19 to 25 inclusive. The plan view, Fig. 19, shows the six plungers 121 and the radial lines 1, and 20 to 25 inclusive indicate those rotary positions of each plunger which are illustrated in those figures of the drawings which have the corresponding numbers. For example, Fig. 20 illustrates the position of any plunger and its pressing mechanisms when approximately at the position indicated on Fig. 19 by the numeral 20. Thus it will be understood that the movements of the plunger and pressing mechanisms are so related to each other that in the normal operation of the machine the plungers 121 are successively lowered into their respective molds in passing from the position 20 to the position 21 of Fig. 19, as illustrated in Figs. 20 and 21, respectively; and each of these normal plunger movements is followed up by the operation of the pressing mechanism at about the position 22, illustrated in Fig. 22, straightening out the toggle joint and thus carrying the plunger to its lowest pressing position, or until discontinued by the releasing of the magnet, illustrated at the left hand side of Fig. 1, which normally takes place at about the rotary position indicated by the numeral 1 in Fig. 19. Each succeeding plunger after being released from the magnet remains in its downward position of Figs. 23 and 24 long enough to allow the glass to set, or until just before reaching the position 25 of Fig. 19 at which position the plunger is raised out of the glass, returning gradually to the position of Fig. 20, to allow of the inverting of the pair of molds and the feeding of another charge of glass to the alternate mold.

The coupling engagement between any pressing lever and its plunger mechanism is, however, conditioned upon two factors, first, the rotary position of the plunger mechanism, which must be at the rotary position at which it is lowered into the mold; and secondly, upon the vertical extent to which the plunger when at that position is thus lowered. At all other rotary positions of the plunger its engaging notch or shoulder 173 either remains above the range of movement of the pressing pawl 37, as illustrated in Fig. 20, or, if lowered within the range of pressing movement of the pawl 37, that pawl is prevented from engaging therewith by being held in a path outside of that shoulder, as illustrated in Fig. 24. The means shown herein for thus guarding each pawl consists of a guard 174, engaging with a stud or roll 182 appurtenant to the pawl. The guard is fixed on the shaft 175, which is mounted for turning movement on a bracket or extension 178 of the bracket 127. The opposite end of the shaft is provided with an operating arm 179, for moving the guard to its desired position. Various means, according to the organization of any given machine, may be employed for thus operating the guards 174 in suitable time and succession, and to the required extent to hold the pawls 37 out of operative engagement with the plunger mechanisms excepting during the normal pressing operations of each. In the present embodiment the operating arm 179 is employed as a cam arm having upon its lower end a cam pin or roll 180, engaging with the cam 181 appurtenant to the plunger yoke blank of the next preceding plunger mechanism, since in this case these movements of each plunger mechanism are found to be suitable for controlling the coupling action of the next following pressing mechanism. In other cases wherein the relative movements of no two of these mechanisms are suited for this purpose, special cams or other similar means may be employed for effecting the movements of the guards 174.

The cams 181 are herein shown to be of the open type operating against one side only of the studs or rolls 180. The action of the pawls 37 against the guards 174 under the tension of the pawl springs 192 would ordinarily serve to press the guards to their backward position when permitted by the lowering of the cam 181 to allow those pawls to engage with the shoulders 173 of their respective cranks. Additional springs 192 are, however, preferably provided for this purpose, extending from the pins 193 on the arms 179 to pins 194 on the brackets 127, or on any other fixed portion of the machine. These springs serve to hold the guards in their backward position of Figs. 21 and 22, when the arms are released from the cams 181.

The guards 174 when in their forward safety position shown in Figs. 24 and 25, to which they are moved after each pressing operation of their respective pawls, hold those pawls entirely out of engagement with the cranks 128 as those pawls are moved up and down through their operating range of movement by the pressing levers 36 during the succeeding five pressing operations of a given revolution of the table, the rolls 182 rolling against the arc-shaped surface of the guards, thus preventing the pressing pawls from engaging with their respective plunger mechanisms a second time during the same revolution of the table. This enables the pressing levers to make their full operating stroke according to the resistance of each individual piece of ware; and also leaves the plunger mechanisms free to elevate each plunger out of its mold at the proper time, without encountering the pressing pawl 37, which if permitted would bring the rising movement of the plunger mechanism into collision with a downward movement of the pressing pawl, thus tending to overstrain or break the mechanism. This safety feature is also of importance in connection with the fact that the succeeding pieces of ware by possible differences in volume cause the release of the magnet at varying portions of the operating stroke of the pressing levers. In cases, for example, where any charge of glass is smaller than that which preceded it, the pressing mechanism in operating upon the smaller gather must make a longer stroke to fill the mold, and this longer stroke would be prevented if the pawl 37 of the preceding pressing mechanism were allowed to come again into coupling engagement with its plunger mechanism which had previously pressed the larger charge or gather. In other words, such a reëngagement of a pressing pawl 37 with a preceding plunger mechanism resting upon a larger charge, would cause the release of the magnet before the succeeding pressing mechanism had completed the pressing of the smaller charge.

Figs. 26 and 27 illustrate the safe operation of these devices under abnormal conditions. In these figures the mechanism is assumed to be operating upon a lump of glass too hard to be pressed or upon an over-sized charge of glass. Fig. 26 illustrates the mechanism approximately at the rotary position indicated by the numeral 26 of Fig. 19, at which rotary position the pressing lever shown in Fig. 26 has already made its pressing stroke upon its plunger mechanisms and is about to repeat its pressing stroke in connection with the succeeding plunger mechanism. The plunger mechanism of Fig. 26, for the sake of illustrating this particular point, is shown to be just low enough to allow the pawl 37 to drop again into operative engagement with the shoulder 173 of the toggle joint. At this time, however, the cam 181 appurtenant to the previous plunger mechanism is moved upward as indicated by the arrow on that cam, its continuing movement acting through the guard 174 to push the pawl 37 in the direction of the adjacent arrow clear of the plunger mechanism, where it remains as shown in Fig. 27 during the succeeding downward pressing strokes of that pawl, during that revolution of the table.

An inlet and suitable passages are provided for receiving air under pressure or delivering it to exhausting means, conducting it through the casing of the machine to or from different positions where its effects may be required, for cooling the plungers or other parts, or for other purposes. The inlet 150 is mounted upon the bushing 148, leaving the latter free to rotate, its inlet passages communicating with the passages 184 and 185 of the crown 157 of the machine, a substantially airtight joint being maintained at 186 by a suitable packing. The tightness of the joint may be regulated by means of the adjusting nut 187. The crown 157 turns with the turret 61 of the machine and is connected therewith by suitable columns 188, the ends of which are flanged and bolted to the turret at the bottom and to the crown at the top. These columns support the crown, and being hollow serve also as conduits for the air leading to or from the air ducts 189 in the turret, which are formed in the casing wherever required, by coring or otherwise. These ducts or conduits may be tapped anywhere to provide outlets or inlets for the air. It will be understood that the inlet 150 remains stationary, being fitted with a stationary connecting pipe, while the crown 157 must revolve with the turret. This crown is herein shown as having two oppositely disposed air ducts. But obviously any number of ducts may be employed and like the air ducts 189 of the turret may be disposed wherever they will be most convenient for use.

The operation of the various parts has to a considerable extent already been described in connection with the description of their construction, in view of which a brief description of the consecutive operation of the machine will be sufficient.

The machine being started in operation, the plunger mechanisms revolve with the table around the central column and the pressing head. Each plunger mechanism performs its complete cycle of movement once for each revolution with the table, while the pressing mechanism, operated through the pressing head from the pressing cam 23 is moved up and down six times during that revolution, once for each of the plunger mechanisms, moving the pressing levers 36 in unison on their pivot shafts 33. The charges of glass are fed into the succeeding molds about at the position indicated by the letter F on the diagram of Fig. 19. The plungers are then lowered in succession, between the positions 20 and 22 as shown in Figs. 20, 21 and 22. When operating upon charges of normal volume and plasticity, the plungers sink to or below the position shown in Fig. 21, so that the pressing pawl 37, moved inwardly by its spring will lie behind its coengaging shoulder 173 of the toggle joint. The pressing movement of the levers 36 follows, continuing through the position shown in Fig. 22 to that of Fig. 1, at which the ware is assumed to be completely pressed, and the pressure discontinued by the release of the magnet, the holding power of which has been overcome by the increasing resistance of the ware, when the latter completely fills up the mold. When the magnet thus lets go, the pressing head 15 falls, causing the return movement of the pressing levers, which carry their pawls 37 upwardly, as shown in Fig. 23, in position for operation upon the succeeding plunger mechanism. The magnet is then lowered by its cam 23, picks up the pressing head 15, and moves it with its pressing levers through its next pressing movement, as shown in Figs. 24 and 25, to take effect upon the succeeding plunger. Meanwhile, the particular plunger whose cycle of movements we are now describing, remains in the ware long enough to allow the latter to cool, which is assumed to be at about the position 24 of Fig. 19, illustrated in Fig. 24. The plunger is then raised through the position of Fig. 24 to its highest position of Fig. 20, in which raised position it remains while the mold ring is raised as shown in Fig. 7 and the pair of molds are revolved, thus bringing the alternate mold into operation. The mold ring is then lowered upon the alternate molds, a new charge of glass is fed into this mold, and another pressing operation is performed by repeating the cycle, just described, of the movements of the plunger. Meanwhile, the piece of ware which was pressed in the companion mold, and is now inverted, travels in that position around a considerable portion of the next rotation of the table, being held from falling out by the ware retaining fingers 73, as already described, until it arrives at the take-off position, where it is released and falls upon or is delivered to the take-off or carrier upon or from which it is conveyed to a leer in which it is annealed in the customary way. This delivery of the ware from the mold may be effected just before the mold reaches the position where it must be again revolved into coacting relation to the plunger. Thus each charge of glass, from the time it is first fed into the mold, may be allowed to remain therein during nearly two revolutions of the pressing tables, which in the case of the six plunger mechanism herein illustrated means that each piece of ware may remain in i. mold while ten or more succeeding pieces of ware are being pressed, thus giving ample time for the proper cooling and setting of the ware.

In case of failure to feed a charge of glass into a mold, through failure of the glass feeding mechanism or from any cause, the pressing pressure will be discontinued by the release of the magnet through the collision of the thimbles 159 and 160 (Fig. 4) as above described. This also is a safety feature, preventing collision between, and consequent damage of the ends of the plungers and the mold valves or mold bottoms.

In the concrete embodiment of this invention shown and described herein, the plungers are forced into the molds to effect the shaping of the glass. But it is obvious that these inventions or most of them are equally applicable to presses in which the molds are forced toward said plungers to effect the shaping of the glass, these two forms being understood to be reversals of each other.

It will also be understood that the pressure upon the glass, at which the force of the magnet is overcome, may be varied by varying the electro current flowing through the magnets, as for example by means of a rheostat.

I claim as my invention:—

1. In a glass shaping machine, the combination of a revolving table, a turret carried by the table and having a substantially continuous annular wall, shaping mechanism disposed on the table outside of the turret wall, mechanism within the turret, and substantially inclosed by its wall for actuating the shaping mechanism, including operating connections mounted on the turret wall and connected with the shaping mechanisms outside of said wall.

2. In a glass shaping machine, the combination of a revolving table, a turret carried by the table and having a substantially continuous annular wall, shaping mechanism disposed on the table outside of the turret wall, mechanism within the turret and substantially inclosed by its wall, having connections through the wall for actuating some of the shaping mechanisms, and means below the turret for actuating other of said shaping mechanisms, having an operating connection with said other mechanisms extending within and through said turret and its said inclosed actuating mechanism.

3. In a glass shaping machine, the combination of a revolving table, a turret carried by the table, and having a substantially continuous annular wall, shaping mechanism, and actuating mechanism therefor some of which is mounted on the turret wall, and a supporting column disposed at the center of revolution of the table, and having a supporting bearing for the turret.

4. In a glass pressing machine, a column, a table mounted to revolve around the column, a plurality of pressing mechanisms mounted on the revolving table, and means for operating the pressing mechanisms while revolving, including a cam below the table and a vertically reciprocating driving connection extending through the interior of the column, having a swiveling connection to accommodate the revolving movement of the pressing mechanisms.

5. In a glass pressing machine, the combination of a column, a table supported for revolution on and around the column, plunger mechanism carried by the table, a stationary cam appurtenant to the column for operating the said mechanism through some phases of its movement, and auxiliary pressing mechanism, driven from below the table and having a reciprocating movement extending substantially through the center of revolution of the table and provided with a swiveling connection for operating the revolving plunger mechanism through other phases of its movement.

6. In a glass shaping machine, the combination of a revolving table, a turret mounted on the table and having a substantially continuous annular wall provided on its interior with means for supporting and guiding operating connections for glass shaping mechanisms.

7. In a glass shaping machine, the combination of a revolving table, guides supported by the table, an annular turret carried by the table and supporting the upper ends of the guides, shaping mechanisms mounted for sliding movement on the guides outside the turret, means within the turret and substantially inclosed by its wall for actuating the shaping mechanisms, and means mounted in the turret wall for connecting the said shaping mechanisms with their actuating mechanism within the turret.

8. In a glass shaping machine, the combination of a revolving table, a turret having a substantially continuous annular wall carried by the table, guides supported at their upper ends by the turret, shaping mechanisms mounted on the guides, mechanism within and substantially inclosed by the turret wall for actuating the said mechanisms, and means mounted for sliding movement in the turret wall for connecting the shaping mechanisms with their said actuating means.

9. In a glass shaping machine, the combination of a revolving table, a turret carried by the table and having a substantially continuous annular wall, glass shaping mechanism carried on the outer side of the turret, a cam within and substantially inclosed by the turret for driving the said mechanism, and driving connections between the cam and its mechanisms, including a toothed rack mounted for sliding movement in the wall of the turret.

10. In a glass shaping machine, the combination of a revolving table, a turret carried by the table and having a substantially continuous annular wall, glass shaping mechanism mounted on the outer side of the turret, a cam inside and substantially inclosed by the turret, operating connections for the shaping mechanism, including a toggle, a geared driving connection between the toggle and the said cam, and supplemental mechanism for completing the pressing movement, including actuating means located upon the table and having vertically reciprocating driving connection with the toggle, extending approximately through the center of rotation of the table.

11. In a glass shaping machine, revolving shaping mechanism including a mold, a mold ring and a plunger, guides upon which the plunger and mold ring are both mounted in tandem position for reciprocating movement, and means for reciprocating the mold ring and plunger upon the said guides independently of each other while revolving, including means for causing the pressing operation between the mold and the plunger while both are revolving.

12. In a glass shaping machine, the combination of a plurality of revolving shaping mechanisms, each comprising a mold, mold ring and plunger, guides for each mechanism on which the mold ring and plunger of that mechanism are both mounted in tandem position for reciprocating movement, and means for reciprocating the respective mold rings and plungers upon the said guides independently of each other, and in succession as to the respective mechanisms, including means for causing the pressing operation between the mold and the plunger while both are revolving.

13. In a glass shaping machine, the combination of a plurality of shaping molds and plungers arranged to revolve in a circle, means for revolving the molds and plungers, a cam disposed concentrically with and common to the series of plungers, a turret substantially inclosing the cam, and means, including toothed gearing, mounted on the turret for operatively connecting each of said plungers with the said cam.

14. In a glass shaping machine, the combination of a plurality of revolving shaping mechanisms, an operating cam disposed concentrically with and common to the said mechanisms, a turret substantially inclosing said cam, and means mounted on the turret for operatively connecting each of said mechanisms with said cam, including a toothed rack mounted for vertically sliding movement, and a toothed pinion engaging with the said rack.

15. In a glass pressing machine, the combination of a circularly disposed plurality of revolving pressing plungers and molds, a stationary cam disposed concentrically with and common to the said plungers, a turret substantially inclosing said cam, and operating connections between each of the plungers and said cam including a toothed pinion connected with the plunger, and a toothed rack mounted for vertical sliding movement on the turret and engaging with the said pinion and said cam.

16. In a glass pressing machine, the combination of a plurality of pressing plunger mechanisms arranged to revolve in a circle, and dual coöperating actuating means common to all the said mechanisms, including a centrally disposed stationary cam, a turret substantially inclosing said cam, operating connections mounted on the turret between the cam and each of the said mechanisms, a centrally disposed pressing head arranged for operative engagement with each of the said plunger mechanisms, and actuating means having an operating connection extending through said cam for working the said pressing head.

17. In a glass pressing machine, the combination of a plurality of pressing plunger and mold mechanisms, revolving in a common circle, and dual coöperating actuating means common to all the plungers, including a stationary cam, operating connections between the said cam and each of the said plungers, a second cam, and a driving connection from the said second cam extending through the first named cam, and operatively connected with each of the said plungers.

18. In a glass pressing machine, the combination of a plurality of pressing plungers and molds revolving in a common circle, means including a stationary cam and operating connections between each of said plungers and said cam, for successively raising and lowering the plungers, and coacting pressing means for imparting pressing movement to each of the plungers.

19. In a glass pressing machine, the combination of a traveling pressing mold and plunger, connecting mechanism for the plunger including a crank and connecting rod traveling with the mold and plunger, and forming a toggle joint connection with the plunger and mechanism for moving the crank into and out of position, in which it may operate as a toggle to apply hard pressure to the plunger while the mold and plunger are traveling.

20. In a glass pressing machine, the combination of a pressing mold and plunger, a crank having a toggle joint connection with the plunger, a toothed rack and pinion operatively connected with the crank, and a cam operating through the rack and pinion for turning the crank to move it from a free operating position to a position in which the toggle connection may be utilized for applying hard pressure to the plunger.

21. In a glass pressing machine, the combination of a pressing mold, a plunger therefor, a crank and a connecting rod forming a toggle joint connection with the plunger, a toothed rack and pinion directly connected to the crank, and a cam for operating the rack to move the toggle joint connection to a position in which it may be utilized for applying hard pressure to the plunger.

22. In a glass pressing machine, the combination of a traveling pressing mold and plunger, and plunger operating mechanism including a stationary cam, a traveling rack driven by the cam, a crank having a toothed engagement with the rack, and a connecting rod forming with the crank a toggle joint connection between the cam and the plunger.

23. In a glass pressing machine, the combination of a plurality of revolving pressing molds and plungers, and operating mechanism for the plungers, including a cam common to the plurality of plungers, and a driving connection between the cam and each of the plungers, comprising a toothed rack driven by the cam, and a crank and connecting rod driven by the toothed rack and forming a toggle joint connection with the plunger.

24. In a glass pressing machine, the combination of a plurality of pressing molds and plungers disposed in and revolving in a circle, a stationary cam concentric with and common to the plurality of plungers, and connecting mechanism from the cam to each plunger including toothed gearing, a crank, and a connecting rod forming with the crank a toggle joint connection with the plunger.

25. In a glass pressing machine, the combination of a revolving mold and plunger, mechanism for imparting to the plunger its non-pressing movements while revolving, and other mechanism for imparting to the plunger its pressing movement while revolving.

26. In a glass pressing machine, the combination of a plurality of traveling molds and plungers, mechanism for effecting the non-pressing movements of the plungers in succession while traveling, and other mechanism for effecting the pressing movements of the plungers in succession while traveling.

27. In a glass pressing machine, the combination of a plurality of revolving molds and plungers, mechanism for effecting the non-pressing movements of the plungers in succession while revolving, and other mechanism for effecting the pressing movements of the plungers in succession while revolving.

28. In a glass pressing machine, the combination of a plurality of revolving molds and plungers, mechanism common to and operating successively upon each of the plungers to impart their non-pressing movements, and other mechanism also common to and operating successively upon the said plungers for imparting their final pressing movements while the plungers are revolving.

29. In a glass pressing machine, the combination of a plurality of revolving mold and plunger mechanisms, a stationary cam common to and operating in succession upon each of the said mechanisms for effecting their non-pressing movement, and a second cam with operating connections extending through the first named cam for effecting the final pressing movement of the plunger mechanisms while revolving.

30. In a glass pressing machine, the combination of a plurality of revolving mold and plunger mechanisms, a stationary cam common to and operating in succession upon each of the said mechanisms for effecting their non-pressing movement, and a second cam with operating connections extending axially through the first named cam for effecting the final pressing movement of the plunger mechanisms while revolving.

31. In a glass pressing machine, the combination of a plurality of revolving pressing mold and plunger mechanisms, a stationary cam connected with the respective plunger mechanisms for imparting the idle non-pressing movements of the plunger, and auxiliary pressing mechanism also having operating connections with the plunger mechanisms for imparting to the plungers in succession their pressing movements while revolving.

32. In a glass pressing machine, the combination of a traveling pressing mold and plunger, plunger operating mechanism including a toggle joint, traveling with the plunger, and independently operated pressing mechanism having a traveling connection with the toggle joint and operating thereon to straighten the joint for effecting the pressing movement of the plunger while traveling.

33. In a glass pressing machine, the combination of a plurality of revolving molds and plungers, plunger operating mechanism having revolving connections with the plungers, including a toggle joint, and independently operated pressing mechanism having revolving connections with the toggle joints for straightening them in succession to effect the pressing movements of the plungers while revolving.

34. In a glass pressing machine, the combination of a plurality of revolving pressing molds and plungers, plunger operating mechanism including a toggle joint for each of the plungers, and independently operated pressing mechanisms operating upon the said toggle joints in succession to effect the pressing movements of the respective plungers.

35. In a glass pressing machine, the combination of a plurality of revolving molds and plungers, a plunger operating cam, connecting means including a toggle joint between the cam and each of the said plungers, a pressing cam and means for operatively connecting the pressing cam with each of the said toggle joints for effecting the final pressing movements of the plungers in succession.

36. In a glass pressing machine, the combination of a plurality of traveling pressing mechanisms, and means for operating the said mechanisms in succession, comprising means for moving the said mechanisms through their relatively free preliminary movements, and auxiliary devices connected with and traveling with the pressing mechanisms for independently imparting their more resisted pressing movements.

37. In a glass pressing machine, the combination of a plurality of traveling pressing mechanisms, and means for operating the said mechanisms in succession, comprising means for moving the said mechanisms through their relatively free preliminary movements, and auxiliary devices connected with and traveling with the pressing mechanism for independently imparting their more resisted pressing movements, including means for discontinuing the pressure upon the successive mechanisms when the resistance to that pressure reaches a predetermined degree.

38. In a glass pressing machine the combination of a plurality of pressing mechanisms each including a mold and plunger, mounted to revolve around a common center, operating mechanism acting in succession upon and imparting to the respective pressing mechanisms a cycle of the movements of the latter for each of their revolutions, and a plurality of revolving auxiliary pressing devices having a cycle of movement occurring during each of said revolutions a number of times equal to the number of pressing mechanisms, and arranged to operate successively upon the said pressing mechanisms.

39. In a glass pressing machine the combination of a plurality of pressing mechanisms mounted and arranged to revolve around a common center, a cam disposed concentrically with the said center and engaging with each of said pressing mechanisms to effect their relatively free movements, and a plurality of revolving auxiliary pressing devices each operating a plurality of times during each revolution of the press, equal to the number of pressing mechanisms thereon, and arranged to operate upon said pressing mechanisms in succession at a portion of their path of revolution.

40. In a glass pressing machine the combination of a plurality of glass pressing mechanisms mounted to revolve around a common center, operating mechanism for imparting to each pressing mechanism in succession a cycle of movement coextensive with a complete revolution of the said pressing mechanism, and a plurality of revolving auxiliary pressing devices coacting with the said operating mechanism, and completing a cycle of their operations upon each pressing mechanism during a portion of the revolution of said mechanism.

41. A glass pressing machine having a plurality of revolving pressing mechanisms each including a mold and plunger, plunger operating mechanism having a cycle of movement coextensive with a complete revolution of the plunger, and a plurality of revolving auxiliary pressing devices coacting with the plunger mechanism and moving through their respective cycles of operation successively during each revolution of a given plunger a number of times equal to the plurality of pressing mechanisms.

42. The combination, in glass pressing mechanism, of operating means for effecting the relatively free movements of the pressing mechanism, and a coacting pressing device, and means for conditionally connecting the said pressing device with the said operating mechanism to complete the pressing movement only under normal conditions within the mold.

43. The combination, in glass pressing mechanism, of operating means for effecting the relatively free movements of the pressing mechanism, an independently operated auxiliary pressing device including a lever, and means for conditionally connecting the lever with the said operating mechanism for completing the pressing movement only under normal conditions within the mold.

44. The combination, in glass pressing mechanism, of operating mechanism including a crank for effecting the relatively free movements of the pressing mechanism, and a separately operated auxiliary pressing device having a pressing lever mounted in a substantially concentric relation to the crank and means for conditionally coupling the lever with the said operating mechanism, to complete the pressing movement under normal conditions.

45. The combination, in glass pressing mechanism, of operating means for effecting the relatively free movements of the pressing mechanism, including a crank and a connecting rod forming a toggle joint connection with the pressing mechanism, and a separately operated auxiliary pressing device including a pressing lever provided with a pawl for coupling the said pressing lever with the toggle joint for completing the pressing movement of said joint.

46. The combination, in glass pressing mechanism, of operating means for effecting the relatively free movements of the pressing mechanism, including a toggle joint connection with the pressing mechanism, and a separately operated auxiliary pressing device including a pressing lever provided with a pawl for conditionally engaging with some portion of the toggle joint connection to straighten the toggle joint and thus effect the pressing movement.

47. The combination, in glass pressing mechanism, of means for effecting the relatively free movements of the pressing mechanism, including a crank member having a toggle joint connection with the pressing mechanism, and a separately operated coacting pressing device including a pressing lever mounted in approximate axial coincidence with the crank and provided with a pawl for engaging with some portion of the toggle joint connection to straighten the toggle joint and thus complete the pressing movement of the mechanism.

48. The combination, in glass pressing mechanism, of means for effecting the relatively free movements of the pressing mechanism, including a toothed pinion having a toggle joint connection with the pressing mechanism, and a separately operated coacting pressing device including a pressing lever mounted in a substantially concentric relation to the toothed pinion, and a pawl for connecting the pressing lever with some portion of the toggle joint to complete the pressing movement of the mechanism.

49. The combination, in glass pressing mechanism, of means for effecting the relatively free movements of the pressing mechanism, including toothed gearing having a toggle joint connection with the pressing mechanism, and a separately operated coacting pressing device including a pressing lever mounted in substantially concentric relation to some of the toothed gearing, and a pawl for effecting engagement and disengagement between the pressing lever and some portion of the toggle joint connection.

50. In a glass pressing machine, the combination of a revolving pressing mechanism, operating means for effecting the relatively free movements of the pressing mechanism, and a separately operated coacting pressing device including a pressing lever disposed in a radial relation to the center of revolution of the pressing mechanism, means for coupling one portion of the pressing lever to and uncoupling it from a working portion of the said pressing mechanism, and actuating means for the pressing lever including a reciprocating driving member and a sliding box for effecting working connection between the said driving member and the pressing lever.

51. In a glass pressing machine, the combination of a plurality of pressing mechanisms mounted to revolve, operating means for effecting the relatively free movements of each of the pressing mechanisms in succession, and a separately operated coacting pressing device including a separate pressing lever for each of said pressing mechanisms, and means for effecting engagement and disengagement between the pressing mechanisms and their respective pressing levers.

52. In a glass pressing machine, the combination of a plurality of pressing mechanisms mounted to revolve, operating means for effecting the relatively free movements of each of the pressing mechanisms in succession, and a separately operated coacting pressing device including a separate pressing lever for each of said pressing mechanisms and pawl mechanisms for effecting engagement and disengagement between the pressing mechanisms and their respective pressing levers.

53. In a glass pressing machine, the combination of a plurality of pressing mechanisms mounted to revolve around a common center, operating mechanisms for effecting the relatively free movements of the pressing mechanisms in succession, and a separately operated auxiliary pressing device including a plurality of pressing levers for the respective pressing mechanisms, and means adjacent to the center of revolution of the mechanisms for operating the said levers in common.

54. In a glass pressing machine, the combination of a plurality of pressing mechanisms mounted to revolve around a common center, operating mechanisms for effecting the relatively free movements of the pressing mechanisms, a pressing device comprising a plurality of pressing levers, one for each of said mechanisms, and means adjacent to the said common center of revolution for engaging the said pressing levers and operating them in unison.

55. In a glass pressing machine, the combination of a plurality of pressing mechanisms mounted to revolve around a common center, operating means for effecting the relatively free movements of the pressing mechanism, and auxiliary pressing devices including a plurality of pressing levers, one for each of said mechanisms, means for coupling and uncoupling the pressing levers to and from the revolving pressing mechanisms, and means disposed in substantially concentric relation to the said pressing levers for operating them.

56. In a glass pressing machine, the combination of a plurality of pressing mechanisms mounted to revolve around a common center, operating mechanisms for effecting the relatively free movements of the pressing mechanisms in rotation, and auxiliary pressing devices including a plurality of pressing levers one for each of said pressing mechanisms, means operating conditionally upon the extent of the respective free movements coupling together and uncoupling working portions of the said pressing levers and their respective mechanisms, and means disposed in substantially concentric relation to the said pressing mechanisms for operating the said pressing levers in unison, once for each movement of the pressing mechanisms.

57. In a glass pressing machine, the combination of a plurality of pressing mechanisms mounted to revolve around a common center, operating mechanism for effecting the relatively free movements of the pressing mechanisms in succession, and auxiliary pressing devices, including a plurality of pressing levers disposed in a generally radial relation to the said common center of revolution, means for coupling and uncoupling the outer ends of the said levers to and from their respective pressing mechanisms, and actuating means adjacent to the said center of revolution for yoking together the inner ends of the said pressing levers in unison.

58. In a glass pressing machine, the combination of a plurality of pressing mechanisms mounted to revolve around a common center, operating mechanism for effecting the relatively free movements of the respective pressing mechanisms in succession, auxiliary pressing devices including a plurality of pressing levers disposed with their inner ends in proximity to the said common center of revolution, means controlled by the said free movements for conditionally coupling and uncoupling the outer ends of said levers to and from their respective pressing mechanisms, and actuating means for the levers including a reciprocating driving member and a sliding box for each lever forming a working joint between the respective levers and the said driving member.

59. In a glass pressing machine, the combination of a plurality of pressing mechanisms, and means for operating the said mechanisms in succession, comprising means for moving the said mechanisms in succession through their relatively free preliminary movements, and auxiliary devices having a common operating means for imparting the more resisted pressing movements of the mechanisms, including means for putting the said auxiliary devices successively into operation upon the pressing mechanisms conditioned upon the latter being moved through their normal preliminary movements by their said moving means.

60. In a glass pressing machine, the combination of a plurality of pressing mechanisms, and means for operating the said mechanisms in succession, including means for effecting the relatively free preliminary movements of the pressing mechanism, auxiliary devices having a common operating means for effecting the more resisted pressing movements of the mechanism, means for putting the said auxiliary devices into operation upon the pressing mechanisms conditioned upon the latter being moved through their respective normal preliminary movements by their said moving means, and means for discontinuing each of the successive pressing movements when the resistance thereto reaches a predetermined degree.

61. In a shaping machine, the combination of a plurality of shaping mechanisms, means for effecting the relatively free movements of the shaping mechanisms in succession, auxiliary pressing means for effecting the more resisted shaping movements, devices for coupling the auxiliary pressing means in succession with the shaping mechanisms, and means conditioned upon the operation of a shaping mechanism for controlling the coupling action upon a succeeding mechanism.

62. In a shaping machine, the combination of a plurality of revolving shaping mechanisms, operating means for effecting the relatively free movements of the said mechanisms in succession, auxiliary pressing means coacting in succession with the said mechanisms for effecting their more resisted shaping movements, devices for coupling the said auxiliary and pressing mechanisms for coaction, and means conditioned upon the operation of one shaping mechanism, for controlling the coupling action upon a succeeding mechanism.

63. In a glass pressing machine the combination of a plurality of revolving pressing mechanisms, operating means for effecting the relatively free movements of the pressing mechanisms once for each complete revolution of each mechanism, a plurality of auxiliary pressing devices each repeating a cycle of pressing operations a plurality of times during said revolution, coupling devices for connecting the said auxiliary devices successively with the respective operating means, each during a single cycle of movement of the said auxiliary devices, in each of said revolutions, and means for preventing the said coupling action during the repeated cycles of operation of the said auxiliary devices, which occur during the said revolution.

64. In a glass pressing machine the combination of a plurality of pressing mechanisms arranged to follow each other in a circle of revolution, operating mechanisms for effecting the relatively free movements of each pressing mechanism once for each of its complete revolutions, a plurality of auxiliary pressing devices each having a cycle of movement repeated during each revolution of the press a number of times equal to the number of pressing mechanisms, coupling devices for coupling the said auxiliary pressing devices and the said operating mechanism together for a portion of the revolution of each pressing mechanism, including means for preventing the coupling action upon the same pressing mechanism more than once during the same revolution.

65. In a glass pressing machine, the combination of a plurality of pressing mechanisms mounted to revolve around a common center, each of said mechanisms including a mold and a shaping plunger, operating mechanism for moving one of the said two members of each of the said pressing mechanisms in rotation, and a release or let-go device revolving with and forming a part of the coöperating connection in said operating mechanism, the said release or let-go mechanism being automatically operative at a predetermined pressing pressure to wholly or substantially discontinue the pressing pressure upon the article being pressed.

66. In a glass pressing machine, the combination of a plurality of sets of traveling molds and plungers, and pressing mechanism traveling with and acting in succession upon the said sets, and means common to a plurality of said sets for discontinuing the pressure upon each set when the desired degree of pressure is attained.

67. In a press, the combination of a plurality of sets of traveling pressing molds and plungers, each set comprising at least a mold and plunger, pressing mechanism traveling with and acting successively on the said sets, and let-go mechanism common to all the said sets for automatically discontinuing the pressure upon each set upon the attainment of the desired degree of pressure.

68. In a glass pressing machine, the combination of a plurality of revolving pressing mechanisms, means for operating the said pressing mechanisms in rotation while revolving, including an electromagnet common to the said plurality of pressing mechanisms and having a traveling connection with each of them whereby the operating connection is released when the pressing pressure reacting upon the magnet by the respective pressing mechanisms exceeds the holding power of the magnet.

69. In a glass pressing machine, the combination of a plurality of traveling pressing mechanisms, means for operating the said pressing mechanisms in rotation while traveling, including an electromagnet forming a part of the connection between the operating means and each of the traveling pressing mechanisms, whereby the operating connection is broken by the release of the magnetic connection when the resistance encountered in any of the pressing mechanisms overcomes the holding power of the magnet.

70. In a glass pressing machine, the combination of a plurality of pressing mechanisms arranged to revolve around a common center, means for operating the said pressing meechanisms in rotation, including an electro-magnet disposed substantially in the center of revolution of the pressing mechanisms, and having independent operating connections to each of them, whereby the pressing pressure in each mechanism is discontinued by the release of the magnet when the holding power of the magnet is overcome by a predetermined degree of resistance to the operation of each pressing mechanism.

71. In a glass pressing machine, the combination of a plurality of pressing mechanisms revolving about a common center, means for operating the said pressing mechanisms in rotation, including an electro-magnet disposed at or near the said common center of revolution, and a plurality of pressing levers each extending from the vicinity of the said magnet to the respective pressing mechanism, working connections between the magnet and the said levers, and means for reciprocating the magnet at each operation of the pressing mechanisms, all arranged and operating to utilize the power of the magnet to effect the pressing operation, and to release the pressure when the resistance of the movement of each pressure mechanism overcomes the power of the magnet.

72. In a glass pressing machine, the combination of a plurality of pressing mechanisms arranged to revolve around a common center, and means for operating the said pressing mechanisms separately in rotation including an electro-magnet disposed at or near the said common center of revolution, an armature adjacent to the magnet, means including a plurality of levers each connecting the said armature with the respective mechanism, and means for reciprocating the magnet.

73. In a glass shaping machine, the combination of shaping mechanism, including a traveling shaping plunger and mold mechanism provided with a plurality of shaping cavities arranged to travel with the plunger, means for operating the pressing mechanism, and means for shifting the shaping cavities between the pressing operations to bring the cavities successively into coacting relation to the plunger while traveling with the plunger.

74. In a glass shaping machine, the combination of pressing mechanism, including a revolving shaping plunger, and a plurality of shaping molds arranged to revolve with the plunger, means for operating the pressing mechanism, and means for shifting the molds between the pressing operations to bring them successively into coacting relation to the plunger, while revolving with the plunger.

75. In a glass pressing machine, the combination of pressing mechanism including a revolving shaping plunger, a plurality of shaping molds arranged to revolve with the plunger around a common center and arranged also to turn around another center common to the said plurality of molds, means for operating the pressing mechanism, and means for turning the molds on the second named center between the successive plunger operations to bring the molds successively into coacting relation to the plunger.

76. The combination, in a glass pressing machine, of pressing mechanism, including a shaping plunger and a plurality of molds arranged to revolve around a common center, the molds being also arranged to turn around another center common to the plurality of molds, means for effecting the pressing movements of the plunger while revolving with the molds, and means for turning the molds on the second named center between the pressing movements of the plunger to bring them successively into coacting relation to the plunger.

77. The combination, in a glass pressing machine, of pressing mechanism, including a shaping plunger and a plurality of molds arranged to revolve together around a common axis, the molds being also arranged to turn around another axis disposed at an angle with the first named axis, means for imparting the pressing movements to the plunger mechanism while revolving around the first named axis, and means for turning the molds around the second named axis between the said movements of the pressing mechanism, to bring the molds successively into coacting relation to the said plunger.

78. The combination, in a glass pressing machine, of pressing mechanism including a shaping plunger and a pair of reversely disposed shaping molds arranged to revolve with the plunger around a common axis, means for effecting the pressing movements of the mechanism, and means for reversing the relative position of the said molds between the said pressing movements to bring the molds alternately into coacting relation to the plunger.

79. The combination, in a glass pressing machine, of pressing mechanism including a shaping plunger, and a pair of shaping molds arranged to revolve with the plunger around a vertical axis, the molds being reversely disposed relative to each other and mounted to turn upon a substantially horizontal axis, means for operating the said pressing mechanism, and means for turning the molds on their said horizontal axis between the pressing operations to bring them alternately into coacting relation to the shaping plunger.

80. The combination, in a glass pressing machine, of pressing mechanism including a shaping plunger arranged to revolve around a vertical axis, and a pair of shaping molds arranged to revolve with the said plunger around the said vertical axis, and also arranged to turn upon a horizontal axis, the molds being reversely disposed in a symmetrical relation to and on opposite sides of the said horizontal axis, means for operating the pressing mechanism while returning, and means for revolving the said molds on their said horizontal axis between the said pressing operations to bring them alternately into coacting relation to the shaping plunger.

81. In a glass shaping machine, the combination of a plurality of pressing mechanisms arranged to revolve around a common center, each mechanism including a shaping plunger and a plurality of shaping molds for each plunger, means for operating the pressing mechanisms in succession, and means for shifting the molds of each mechanism between its pressing operations to bring the different molds of each mechanism successively into coacting relation to the plunger of that mechanism.

82. In a glass shaping machine, the combination of a plurality of pressing mechanisms arranged to revolve around a common axis, each mechanism including a shaping plunger and a plurality of shaping molds arranged to turn upon another axis common to the molds of the same mechanism, means for operating the pressing mechanism in succession and means for turning the molds of each mechanism between the pressing operations of that mechanism, bringing the successive molds into coacting relation to the plunger of that mechanism.

83. In a glass shaping machine, the combination of a plurality of pressing mechanisms arranged to revolve around a common center, each including a shaping plunger and a plurality of shaping molds, a plurality of molds of each mechanism being also arranged to turn upon an axis common to the molds of that mechanism, means for operating each pressing mechanism once for each of its revolutions around the said center, and means for turning the molds of each mechanism on their said axis after its pressing operation to bring the said molds successively into coacting relation to their associated shaping plunger.

84. In a glass shaping machine, the combination of a plurality of pressing mechanisms arranged to revolve around a common center, each including a shaping plunger, and a plurality of shaping molds for coacting with the plunger, the said molds for each of said mechanisms being mounted for turning movement upon trunnions, means for operating the pressing mechanisms in succession while revolving, and means for revolving the molds of the pressing mechanism on their respective trunnions between their respective pressing operations to bring the succeeding molds into coacting relation to their respective plungers.

85. In a glass shaping machine, the combination of a revolving table, a plurality of glass shaping mechanisms mounted on the table, each including a shaping plunger and a plurality of shaping molds, the molds of each mechanism being mounted for revolution upon trunnions supported by the table to revolve upon axes substantially tangential to the circular path of its travel with the table, means for operating the pressing mechanism in succession, and means for revolving the molds on their trunnions after each of their pressing operations to bring the molds successively into coacting relation to their respective plungers.

86. In a glass shaping machine, the combination of pressing mechanism, including a traveling shaping plunger, and a plurality of shaping molds arranged to travel with the plunger, means for operating the pressing mechanism, means for shifting the molds between the pressing operations to bring them successively into coacting relation to the plunger while revolving therewith, a mold ring common to the plurality of molds and means for transferring the mold ring to and registering it with the succeeding molds.

87. In a glass shaping machine, the combination of pressing mechanism including a revolving shaping plunger and a plurality of shaping molds arranged to revolve with and coact with the plunger, means for shifting the molds between the pressing operations to bring them successively into coacting relation to the plunger, a mold ring common to the plurality of molds, and means for transferring the mold ring to and registering it with the succeeding molds.

88. Glass shaping mechanism, including in combination a shaping plunger, a mold ring, and a plurality of molds, means for operating the plunger, means for raising and lowering the mold ring, and means for shifting the molds when free from the plunger and mold ring to bring the molds in succession into coacting relation to the said plunger and mold ring.

89. In a glass shaping machine, the combination of a plurality of pressing mechanisms arranged to revolve around a common center, each including a shaping plunger, a mold ring and a plurality of shaping molds, means for operating the plunger and mold ring, and means for shifting the molds between the plunger and mold ring operations, to bring the molds successively into coacting relation to the plunger and mold ring.

90. In a glass shaping machine, the combination of a plurality of pressing mechanisms, arranged to revolve around a common center, each including a shaping plunger, a mold ring and a plurality of shaping molds, the latter being disposed and arranged to revolve around a different center, operating mechanism for the plunger and the mold ring, and means for revolving the said molds upon the second named center between the plunger and mold ring operations to bring the mold successively into coacting relation and register with the said plunger and mold ring.

91. In a glass pressing machine, the combination of a shaping plunger, and a plurality of shaping molds arranged to revolve with the plunger around a common center, means for effecting the working movements of the plunger, means for shifting the molds between the successive plunger operations to bring the molds successively into coacting relation with the plunger while revolving with the plunger, a mold ring common to the plurality of molds, and means for transferring the mold ring to and registering it with the succeeding molds, as they are thus brought into coacting relation.

92. The combination, in glass shaping mechanism, of a traveling mold, means for inverting the mold while traveling and a ware supporting finger carried by the mold and mounted to swing in front of the mold opening for supporting the ware when the mold is inverted.

93. The combination, in glass shaping mechanism, of a traveling shaping mold, means for inverting the mold while traveling, and a ware supporting finger appurtenant to and traveling with the mold, and means operable by the traveling movement of the mold for moving the said finger in front of the mold opening, for supporting the ware when the mold is inverted.

94. The combination, in glass shaping mechanism, of a shaping mold arranged to revolve around one axis, and also arranged to revolve around a second axis, and a ware supporting finger carried by the mold and adapted to be moved in front of the mold opening, means for effecting the compound revolutions of the mold, and means for moving the said finger in front of the mold opening to prevent the dropping out of the ware when the mold in inverted.

95. The combination, in glass shaping mechanism, of a plurality of molds arranged to revolve on a vertical axis and also arranged to revolve on a horizontal axis, and a ware supporting finger carried by the molds and operable by their revolving movement around the first named axis to move the said finger in front of the mold opening, whereby the ware is prevented from falling out of the mold when the latter is inverted by revolving on the said horizontal axis.

96. The combination, in glass shaping mechanism, of a plurality of reversely disposed molds mounted for revolution on a substantially horizontal axis, and a plurality of ware supporting fingers pivotally mounted on the said molds to swing in front of and away from the mold openings, and cams for thus swinging the fingers alternately.

97. The combination, in glass shaping mechanism, of a plurality of reversely disposed shaping molds mounted for revolution on a substantially horizontal axis, a pair of ware supporting fingers pivotally mounted to swing each finger in front of its mold opening, and means for operating the fingers in succession to swing them in front of the opening of their respective molds, as the latter are successively inverted by revolving on said axis.

98. The combination, in glass shaping mechanism, of a traveling glass shaping mold, means for inverting the mold while traveling, and a tapping device disposed at the side of the pathway of travel of the mold and operated by the traveling movement of the mold for tapping the bottom of the mold to loosen the pressed ware therefrom.

99. In a ware shaping machine, the combination of a traveling shaping mold, means for inverting the mold while traveling, and means disposed adjacent to the pathway of travel of the mold, and operating upon the ware while traveling to loosen and discharge it from the mold.

100. In a glass shaping machine, the combination of a plurality of shaping molds arranged to revolve around a common center, means for inverting the molds while revolving, and a tapping device consisting of a plurality of hammers disposed adjacent to the path of revolution of the molds, and operated by their revolution for repeatedly tapping the bottom of each mold as it passes by, to release the pressed ware from the molds.

101. In a ware shaping machine, the combination of a plurality of sets of molds and plungers, and pressing mechanism traveling with and acting upon the said sets in succession, and means common to all the sets and having traveling connections to each set for limiting and substantially releasing the pressing pressure.

102. In a ware shaping machine, the combination of a plurality of revolving shaping devices, and dual coacting means operating in succession upon the said devices, including means having independent traveling connections with the revolving shaping devices for limiting the shaping pressure to a predetermined degree.

103. In a ware pressing machine, the combination of a revolving plunger, and a plurality of molds revolving with and alternately coöperating with the plunger, whereby the ware pressed into one of said molds may remain therein while its plunger is pressing its succeeding piece of ware in another of said molds.

104. In a ware pressing machine, the combination of a plurality of revolving molds, a plunger revolving with the molds, and coacting with the said molds in rotation, whereby the ware pressed into each mold may remain therein while another piece of ware is being pressed by the same plunger into the succeeding mold.

105. In a ware pressing machine, the combination of a plurality of revolving molds, a plunger revolving with and coacting in succession with the said plurality of molds, whereby the ware pressed in each mold may remain therein past one complete revolution of the mold and plunger.

106. In a ware pressing machine, the combination of a plurality of sets of revolving molds and plungers, each set comprising a plunger and a plurality of molds coacting in succession with the said plunger, whereby the ware pressed into each mold may remain therein until after another piece of ware has been pressed into a companion mold of the set by the same plunger.

107. In a ware shaping machine, the combination of a plurality of sets of revolving shaping mechanisms, each set comprising a plurality of molds and a plunger, mechanism for causing coaction between each of the plungers and one of the molds of their respective sets during a revolution of the sets, and with another mold of their respective sets during the succeeding revolution of the sets.

108. In a ware shaping machine, the combination of a plurality of sets of revolving shaping mechanisms, each set comprising a plurality of molds and a coacting plunger, mechanism for causing the plungers during a revolution to act in succession upon one of the molds of their respective sets, and during the succeeding revolution to act upon the other molds of their respective sets.

109. In a ware shaping machine, the combination of a plurality of sets of revolving shaping mechanisms, each set comprising a pair of molds and a coacting plunger, means effecting the shaping movements of the plungers in succession during each revolution of the said mechanisms, and means for moving the molds of each pair alternately into coactive relation to their plungers.

110. In a ware shaping machine, the combination of a plurality of sets of revolving shaping mechanisms, each set comprising a pair of molds and a coacting plunger, means effecting the shaping movements of the plungers in succession during each revolution of the said mechanism, and means for successively operating the respective molds to move each mold out of coacting relation to its plunger, after it has been operated upon by the plunger, and to bring its associated mold into coacting position to be acted upon by the succeeding operation of their plunger.

111. In a ware shaping machine, the combination of a plurality of revolving shaping mechanisms, each set comprising a plunger, a pair of coacting molds mounted for revolution relative to the said plunger to bring them alternately into coacting relation to that plunger, means for operating the plungers in succession while revolving with their respective sets, and means for revolving the respective pairs of molds in succession to bring the molds of each pair alternately into coacting relation to their common plunger.

112. In a glass shaping machine, the combination of a reciprocating and sidewise traveling plunger, mold mechanism mounted for revolving movement and provided with a plurality of shaping cavities disposed in a circle of revolution the plane of which substantially coincides with the line of reciprocating movement of the plunger and mounted for sidewise traveling movement with the plunger.

113. In a ware pressing machine, the combination of a revolving plunger and a plurality of molds revolving with and alternately coöperating with the plunger, including coacting means for retaining the ware in the molds after they leave their pressing position.

114. In a glass shaping machine, the combination of a shaping plunger mounted for longitudinal and sidewise traveling movement, mold mechanism mounted to travel sidewise with the plunger and including a plurality of shaping cavities for coöperating with the plunger, mounted for revolving movement in a circle, the plane of which is substantially coincident with the longitudinal position of the plunger and substantially at right angles with the direction of sidewise traveling movement of the plunger and the mold mechanism.

115. In a glass shaping machine, the combination of a shaping plunger mounted for longitudinal and traveling sidewise movement, mold mechanism mounted to travel sidewise with the plunger and including a plurality of shaping cavities mounted for revolving movement upon an axis disposed substantially in line with the direction of sidewise traveling movement of the plunger and mold mechanism.

116. In a rotary glass shaping machine, a shaping plunger mounted for reciprocating shaping movement and for rotary movement with the machine, substantially at right angles to its shaping movement, mold mechanism rotating with the plunger and including a plurality of shaping molds coöperating with the plunger and mounted for revolving movement in a circle, the plane of which is substantially radial to the rotary movement of the plunger and mold mechanism.

117. In a shaping machine, the combination of a plurality of pressing levers disposed in substantially radial relation to a common center and provided at their outer ends with toggle connections for shaping devices, and an operating head mounted for axial movement at the said center and engaging with the said levers.

118. In a shaping machine, the combination with a circularly disposed plurality of shaping devices, of a corresponding plurality of pressing levers disposed in radial relation to the common center of the said devices and provided at their outer ends with toggle connections to the said devices, and an operating head mounted for axial movement at the said center and engaging with the said levers.

119. In a shaping machine, the combination of a plurality of revolving shaping devices, a corresponding plurality of pressing levers disposed in radial relation to the center of revolution, toggle connections between the said levers and the said shaping devices, and an operating head mounted for operating movement in an axial direction relative to the revolving movement, and coupled with the inner ends of the said levers.

In testimony whereof I have signed my name to this specification in the presence of two subscribing witnesses this 7th day of August, 1913.

KARL E. PEILER.

Witnesses:
H. A. GENEST,
E. H. LORENZ.

It is hereby certified that in Letters Patent No. 1,292,033, granted January 21, 1919, upon the application of Karl E. Peiler, of Hartford, Connecticut, for an improvement in "Glass-Pressing Machines," errors appear in the printed specification requiring correction as follows: Page 13, line 35, claim 37, for the word "mechanism" read *mechanisms;* page 15, lines 31-32, claim 57, strike out the words "in unison;" page 17, line 80, claim 80, for the word "returning" read *revolving;* same page and claim, line 81; page 18, line 5, claim 84, for the word "revolving" read *turning;* and that the said Letters Patent should be read with these corrections therein that the same may conform to the record of the case in the Patent Office.

Signed and sealed this 29th day of July, A. D., 1919.

[SEAL.]

J. T. NEWTON,
*Commissioner of Patents.*

Cl. 49—37.